(12) United States Patent
Kim et al.

(10) Patent No.: US 12,482,350 B2
(45) Date of Patent: Nov. 25, 2025

(54) METHOD AND SYSTEM FOR CALCULATING AND COMPARING EVALUATION INDICES FOR SIGNAL SYSTEM OF INTERSECTION

(71) Applicant: Pintel Co., Ltd, Yongin-si (KR)

(72) Inventors: Dong Key Kim, Seoul (KR); Sun Jung Kim, Seoul (KR); Hae Won Yoon, Seoul (KR)

(*) Notice: Subject to any disclaimer, the term of this patent is extended or adjusted under 35 U.S.C. 154(b) by 0 days.

(21) Appl. No.: 18/688,902

(22) PCT Filed: Dec. 11, 2023

(86) PCT No.: PCT/KR2023/020321
§ 371 (c)(1),
(2) Date: Mar. 4, 2024

(87) PCT Pub. No.: WO2024/128724
PCT Pub. Date: Jun. 20, 2024

(65) Prior Publication Data
US 2025/0299563 A1  Sep. 25, 2025

(30) Foreign Application Priority Data
Dec. 16, 2022 (KR) .................. 10-2022-0177470

(51) Int. Cl.
*G08G 1/01* (2006.01)
*G06V 20/54* (2022.01)

(52) U.S. Cl.
CPC .......... *G08G 1/0116* (2013.01); *G06V 20/54* (2022.01); *G08G 1/0145* (2013.01); *G06V 2201/08* (2022.01)

(58) Field of Classification Search
CPC .... G08G 1/0116; G08G 1/0145; G06V 20/54; G06V 2201/08
(Continued)

(56) References Cited

U.S. PATENT DOCUMENTS 5,357,436 A * 10/1994 Chiu ..................... G08G 1/07
340/916
6,317,058 B1 * 11/2001 Lemelson .............. G08G 1/087
340/905

(Continued)

FOREIGN PATENT DOCUMENTS

| KR | 10-2020-0007577 | 1/2020 |
| KR | 10-2217870 | 2/2021 |
| KR | 10-2323437 | 11/2021 |

OTHER PUBLICATIONS

"Office Action for Korea Patent Application No. 10-2022-0177470, mailed Feb. 17, 2023."

*Primary Examiner* — Luis A Martinez Borrero
(74) *Attorney, Agent, or Firm* — Youngil Lee

(57) ABSTRACT

A method for calculating and comparing evaluation indices for a signal system of an intersection includes: a traffic statistical information generation step of receiving image information in real time through cameras to derive traffic object information including traffic volume for each driving direction and traffic volume for each lane on a corresponding road at a preset first cycle, and to generate traffic statistical information including the traffic object information and intersection environment information; a digital twin generation step of inputting the traffic statistical information to a simulator, and implementing a traffic situation of the intersection as a graphical digital twin; and a composite congestion index derivation step of deriving a composite congestion index from each of an actual digital twin and a virtual digital twin, in which the evaluation indices are derived based on a congestion time of a predetermined number of vehicles at the corresponding intersection.

14 Claims, 18 Drawing Sheets

(58) Field of Classification Search
USPC .......................................................... 701/118
See application file for complete search history.

(56) References Cited

U.S. PATENT DOCUMENTS

| | | | | |
|---|---|---|---|---|
| 7,155,376 | B2* | 12/2006 | Yang | G08G 1/0112 |
| | | | | 701/532 |
| 9,014,955 | B2* | 4/2015 | Sakakibara | G08G 1/0141 |
| | | | | 701/118 |
| 9,076,332 | B2* | 7/2015 | Myr | G08G 1/04 |
| 9,805,595 | B1* | 10/2017 | Liebinger Portela | G08G 1/087 |
| 10,078,962 | B1* | 9/2018 | Epperlein | G08G 1/083 |
| 10,692,365 | B2* | 6/2020 | Ran | G08G 1/096725 |
| 10,867,512 | B2* | 12/2020 | Ran | G08G 1/096725 |
| 11,783,702 | B2* | 10/2023 | Mohamad Alizadeh Shabestary | G06N 3/092 |
| | | | | 340/909 |
| 12,020,566 | B2* | 6/2024 | Pittman | G08G 1/0112 |
| 2002/0198694 | A1* | 12/2002 | Yang | G08G 1/0112 |
| | | | | 703/6 |
| 2013/0176146 | A1* | 7/2013 | Dusparic | G08G 1/07 |
| | | | | 340/907 |
| 2014/0149029 | A1* | 5/2014 | Sakakibara | G08G 1/0141 |
| | | | | 701/118 |
| 2014/0278052 | A1* | 9/2014 | Slavin | G01C 21/3492 |
| | | | | 701/400 |
| 2015/0102945 | A1* | 4/2015 | El-Tantawy | G08G 1/081 |
| | | | | 340/909 |
| 2018/0336781 | A1* | 11/2018 | Jin | G06V 20/41 |
| 2021/0233394 | A1* | 7/2021 | Sakakibara | G08G 1/0133 |
| 2022/0092973 | A1* | 3/2022 | Mohamad Alizadeh Shabestary | G08G 1/04 |
| 2022/0198925 | A1* | 6/2022 | Mohamad Alizadeh Shabestary | G08G 1/0116 |
| 2024/0427959 | A1* | 12/2024 | Kawatani | G06F 30/20 |

\* cited by examiner

FIG. 5

| CAM #1 | ··· | ④ | ① | ② | ③ | ④ | ··· | ④ | ① | ··· |
|---|---|---|---|---|---|---|---|---|---|---|
| CAM #2 | ··· | ③ | ④ | ① | ② | ③ | ··· | ③ | ④ | ··· |
| CAM #3 | ··· | ② | ③ | ④ | ① | ② | ··· | ② | ③ | ··· |
| CAM #4 | ··· | ① | ② | ③ | ④ | ① | ··· | ① | ② | ··· |

PRESET FIRST CYCLE

METHOD AND SYSTEM FOR CALCULATING AND COMPARING EVALUATION INDICES FOR SIGNAL SYSTEM OF INTERSECTION

BACKGROUND OF THE INVENTION

1. Field of the Invention

The present invention relates to a method and a system for calculating and comparing evaluation indices for a signal system of an intersection, which find causes of traffic jam occurring in real time such as the number of vehicles, movement of vehicles, and the signal system that change on the intersection, formulate and calculate the evaluation indices, and compare one or more evaluation indices calculated by variously changing parameters of the evaluation indices with each other so as to find the most effective signal system in alleviating the traffic jam.

2. Description of the Related Art

A digital twin is a case in which all processes, services, or physical products have a dynamic digital form or expression, and in this case, it may be evaluated and manipulated based on analysis of the digital twin in various working environments. Basically, the digital twin uses real data to generate a simulation that predicts a freight charge of a product or process through a computer program.

The metaverse is a compound word of the English word "Meta" which means "virtual," "transcendental," and "universe," which means space, and refers to a three-dimensional virtual world in which social, economic, and cultural activities such as the real world take place. The metaverse is a concept that has evolved one step further than virtual reality (VR), and uses avatars not only to enjoy games or virtual reality, but also to engage in social and cultural activities like real reality.

Meanwhile, in accordance with the current increase in the number of people worldwide and the development of science and technology, the number of people driving vehicles has increased significantly, and at the same time, countless people have suffered from traffic jams every day. In order to solve this traffic jam, it is necessary to develop a method for analyzing a situation predicted by finding causes of traffic jam and correcting these causes through traffic simulation.

When the conventional traffic simulation is performed, a method for predicting a traffic condition based on traffic statistical information collected during a certain analysis period is used. However, this method has a problem in that the accuracy of information is low compared to the actual traffic situation that changes from time to time. Therefore, in order to increase the accuracy of traffic situation information, it is necessary to develop a method for predicting a traffic condition in real time and solving problems using digital twin and metaverse.

Meanwhile, the traffic situation at the actual intersection is implemented as a digital twin and a metaverse, so even if a user continues to monitor the traffic situation, a plurality of vehicles move from time to time, which inevitably causes traffic jams that occur at some point. Deploying a large number of manpower to solve this problem may be a serious waste of manpower. Thus, there is a need to develop a method for allowing the user to recognize the degree of traffic jam relatively conveniently and quickly.

Moreover, there is a problem in that even if the user recognizes the traffic jam at the intersection, it is not systematic to determine the degree of traffic jam and present a solution. Therefore, it is necessary to develop a method for digitalizing the degree of traffic jam. In addition, when the degree of traffic jam is formulated by finding indices that cause the traffic jam and using the indices, the traffic jam may be systematically alleviated by changing the indices. Therefore, there is a need to develop a method for formulating the degree of traffic jam using indices that cause traffic jam so as to quickly cope with the traffic jam occurring in real time.

SUMMARY OF THE INVENTION

An object of the present invention is to provide a method and a system for calculating and comparing evaluation indices for a signal system of an intersection, which find causes of traffic jam occurring in real time such as the number of vehicles, movement of vehicles, and the signal system that change on the intersection, formulate and calculate the evaluation indices, and compare one or more evaluation indices calculated by variously changing parameters of the evaluation indices with each other so as to find the most effective signal system in alleviating the traffic jam.

According to one embodiment of the present invention, unnecessary information may not be updated using a cycle shorter than a preset signal cycle that is a unit of traffic statistical information, thereby minimizing the amount of wasted computer resources.

According to one embodiment of the present invention, traffic image information is received in real time compared to the conventional traffic simulation implemented by collecting the past traffic information so that a simulation, which is almost identical to a real traffic environment of an actual intersection and changes from time to time, may be implemented, thereby increasing the accuracy of traffic statistical information.

According to one embodiment of the present invention, a real-time traffic situation is implemented as a digital twin and metaverse, and virtual signal system information is received without any risk to recognize a predicted situation of an actual traffic situation, thereby enabling safe and rapid discovery of an optimal signal system and solving a problem of an actual traffic situation in real time.

According to one embodiment of the present invention, the degree of traffic jam occurring in real time is formulated and calculated as an evaluation index, so that the user does not need to monitor the movement of the vehicle changing in real time from time to time, easily recognizes the degree of traffic jam at the intersection, and prevents excessive input of additional manpower to prevent a situation in which the user misses the movement of the vehicle.

According to one embodiment of the present invention, when the traffic jam occurs in an actual traffic situation, one or more evaluation indices are calculated by changing the parameters of the evaluation indices causing the traffic jam and are compared with the evaluation indices of the actual traffic situation, thereby finding the evaluation indices deriving the most effective result for alleviating the traffic jam occurring in real time and suggesting a solution.

BRIEF DESCRIPTION OF THE DRAWINGS

FIG. 5 schematically illustrates a process of setting a signal system cycle of the intersection according to one embodiment of the present invention.

DETAILED DESCRIPTION OF THE INVENTION

The "user terminal" mentioned below may be implemented as a computer or a portable terminal that may access a server or another terminal through a network. The computer described herein may include, for example, a notebook computer, a desktop computer, a laptop computer, and the like in which a web browser is mounted, and the portable terminal is, for example, a wireless communication device in which portability and mobility are guaranteed, and may include all kinds of handheld-based wireless communication devices such as a smartphone, a personal communication System (PCS), a global system for mobile communications (GSM), a personal digital cellular (PDC), a personal handyphone system (PHS), a personal digital assistant (PDA), an international mobile telecommunication (IMT)-2000, a code division multiple access (CDMA)-2000, a W-code division multiple access (W-CDMA), a wireless broadband Internet (Wibro) terminal, and the like. In addition, the "network" may be implemented as a wired network such as a local area network (LAN), a wide area network (WAN), or a value added network (VAN), or all types of wireless networks such as a mobile radio communication network or a satellite communication network.

1. Method and System for Implementing Real-Time Traffic Situation as Digital Twin and Metaverse "1. Method And System for Implementing Real-time Traffic Situation As Digital Twin And Metaverse", which will be described later, corresponds to the invention describing in detail a method and a system for implementing a traffic situation at an actual intersection as a digital twin and metaverse in "2. Method And System for Calculating And Comparing Evaluation Indices for Signal System of Intersection.

Figure 1:
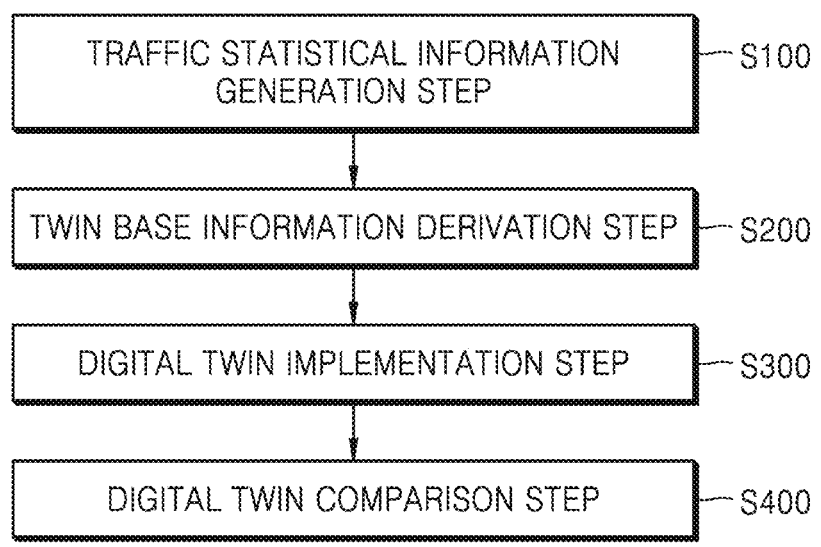
FIG. 1 schematically illustrates detailed steps of a method for implementing a real-time traffic situation as a digital twin according to one embodiment of the present invention.

FIG. 1 schematically illustrates detailed steps of a method for implementing a real-time traffic situation as a digital twin 300 according to one embodiment of the present invention.

As illustrated in FIG. 1, there is provided a method for implementing a real-time traffic situation as the digital twin 300, which is performed in a computing system 1000 including one or more memories and one or more processors, in which the method includes: a traffic statistical information generation step S100 of receiving image information in real time through cameras installed at points facing each road of the intersection to derive traffic object information including traffic volume for each driving direction and traffic volume for each lane on a corresponding road at a preset first cycle, and to generate traffic statistical information including the traffic object information and intersection environment information including signal system information of a corresponding intersection; a twin base information derivation step S200 of inputting the traffic statistical information, which is generated in a unit of the preset first cycle, to a simulator 1210, and deriving twin base information, which is used to implement the digital twin 300 of the intersection in real time, from the simulator 1210 in a second cycle shorter than the first cycle; and a digital twin implementation step S300 of implementing a traffic situation of the intersection as a graphical digital twin based on the twin base information, in which the preset first cycle is set based on an actual signal system cycle of the corresponding intersection.

In addition, the digital twin implement step S300 includes: a step of generating an actual digital twin 311 generated based on the intersection environment information including the traffic object information of the actual intersection and the actual signal system information of the corresponding intersection; and a step of generating one or more virtual digital twins 312 generated based on the intersection environment information including the traffic object information of the actual intersection and the virtual signal system information of the corresponding intersection.

Additionally, the method for implementing an actual traffic situation as the digital twin 300 may further include a digital twin comparison step S400, and in the digital twin comparison step S400, the actual digital twin 311, to which the actual signal system information is applied, and the virtual digital twin 312, to which the virtual signal system information is applied, are output the actual digital twin 311 and the virtual digital twin 312 to a user terminal 2000 such that the actual digital twin 311 may be compared with the virtual digital twin 312. The digital twin comparison step S400 will be described in more detail later with reference to FIG. 8.

Specifically, the traffic statistical information generation step S100 is performed a plurality of times on a target intersection according to the preset first cycle. A conventional simulator has used past information obtained by collecting information of the target intersection and preparing statistics thereof. Since such a method may not basically cope with a traffic environment that changes in real time, such as a road construction, a traffic accident, and bad weather, inaccuracy of information derived through the simulator 1210 is inevitably generated. To solve such a problem, in the embodiments of the present invention, even after the traffic statistical information is generated through the traffic statistical information generation step S100 at the initial stage, the traffic statistical information generation step S100 is performed repeatedly, so that it is possible to cope with the traffic environment that changes in real time, and accordingly, it is possible to increase the accuracy of the information derived as a result of the present invention.

The preset first cycle corresponds to one cycle of the signal system of the corresponding intersection, and a more detailed description thereof will be described later in FIG. 5.

Figure 2:
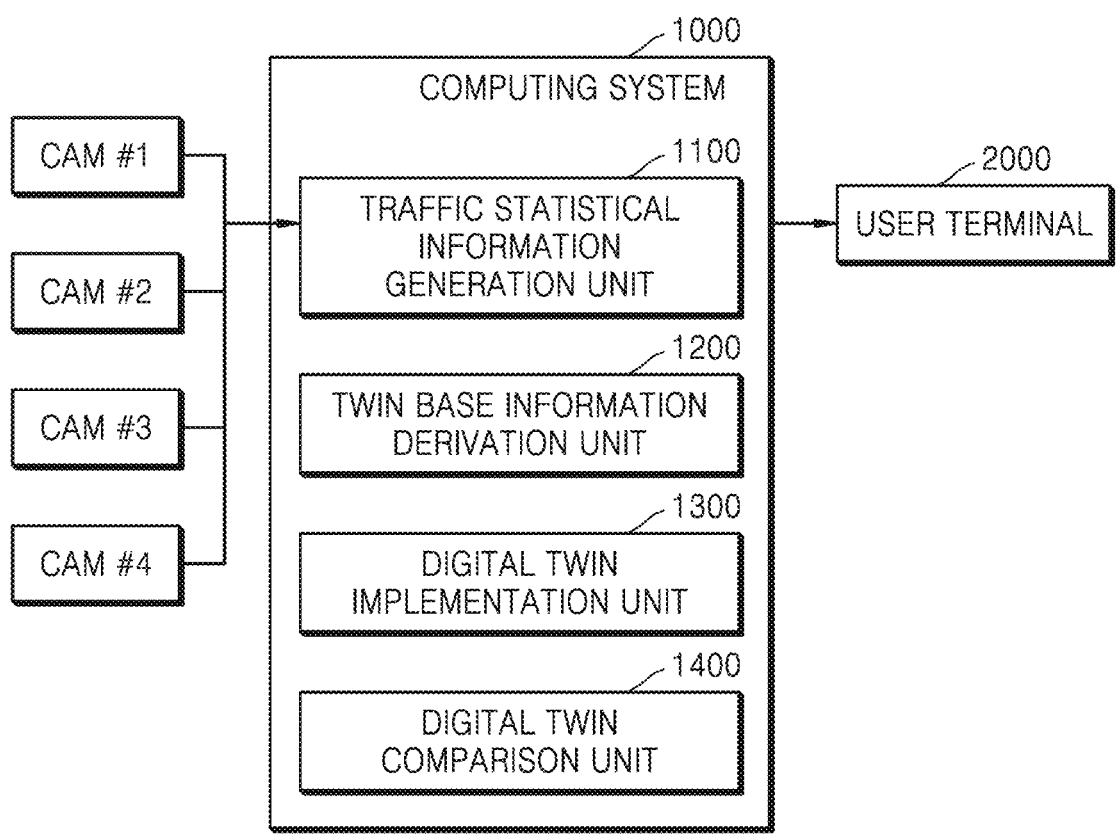
FIG. 2 schematically illustrates constituent elements for performing the method for implementing a real-time traffic situation as a digital twin according to one embodiment of the present invention.

FIG. 2 schematically illustrates constituent elements for performing the method for implementing a real-time traffic situation as the digital twin 200 according to one embodiment of the present invention.

As illustrated in FIG. 2, there is provided a system for implementing a real-time traffic situation as the digital twin 300, which is implemented by a computing system 1000 including one or more memories and one or more processors, in which the system includes: a traffic statistical information generation unit 1100 which receives image information in real time through cameras installed at points facing each road of the intersection to derive traffic object information including traffic volume for each driving direction and traffic volume for each lane on a corresponding road at a preset first cycle, and to generate traffic statistical information including the traffic object information and intersection environment information including signal system information of a corresponding intersection; a twin base information derivation unit 1200 which inputs the traffic statistical information, which is generated in a unit of the preset first cycle, to a simulator 1210, and derives twin base information, which is used to implement the digital twin 300 of the intersection in real time, from the simulator 1210 in a second cycle shorter than the first cycle; and a digital twin implementation unit 1300 which implements a traffic situation of the intersection as the graphical digital twin 300 based on the twin base information, in which the preset first cycle is set based on an actual signal system cycle of the corresponding intersection.

Additionally, the system for implementing a traffic situation as the digital twin 300 may further include the digital twin comparison unit 1400, in which the digital twin comparison unit 1400 performs the digital twin comparison step S400, and transmits, to the user terminal 2000, the actual digital twin 311, to which actual signal system information is applied, and the virtual digital twin 312, to which one or more virtual signal system information is applied, such that the user may easily compare the actual digital twin 311 with the virtual digital twin 312, and the user terminal 2000 displays the actual digital twin 311 and the virtual digital twin 312, which are received from the digital twin comparison unit 1400, on its own display. The digital twin comparison step S400 will be described in more detail later with reference to FIG. 8.

Specifically, a plurality of cameras CAM #1 to CAM #4 installed at the intersection transmit captured image information to the computing system 1000. Meanwhile, FIG. 2 is one embodiment of the present invention, in which the number of cameras is set to for in order to implement one a cross (+)-shaped intersection as the digital twin 300 for convenience of description, and when the computing system 1000 implements the digital twin 300 for a plurality of intersections, the cameras installed at corresponding intersections, respectively, may transmit the image information to the computing system 1000. In this case, the number of cameras in communication with the computing system 1000 may vary depending on the user's intention in consideration of one or more factors such as the type and shape of the intersection.

The traffic statistical information generation unit 1100 performs the traffic statistical information generation step S100, and receives the image information in real time from the plurality of cameras installed at the corresponding intersections, respectively, to generate traffic object information and intersection environment information on the corresponding road every preset first cycle. Meanwhile, initial intersection environment information includes intersection geographic information including the shape, the number of lanes, and the like of the intersection in addition to the signal system information, and after the intersection geographic information is first input to the simulator 1210, traffic statistical information including only the traffic object information and the signal system information excluding the intersection geographic information is generated in a unit of the predetermined first cycle, so that it is possible to reduce computing resources used for calculation, analysis, and implementation.

The twin base information derivation unit 1200 performs the twin base information derivation step S200. More specifically, in the twin base information derivation step S200, twin base information is derived by inputting the traffic statistical information generated in the traffic statistical information generation unit 1100 to the simulator 1210 included in the twin base information derivation unit 1200. The twin basic information includes: position coordinate information of a vehicle moving on the corresponding intersection based on a preset coordinate system of the simulator 1210; vehicle characteristic information; and geographic coordinate information corresponding to intersection geographic information of the corresponding intersection.

The digital twin implementation unit 1300 performs the digital twin implementation step S300, and implements the digital twin 300 based on the twin base information generated in the simulator 1210. Since the digital twin 300 implemented through the digital twin implementation step S300 reflects traffic statistical information input in real time as compared with the conventional traffic simulation, the accuracy of derived information is increased, and a traffic situation matching the traffic situation of the corresponding intersection is displayed.

Further, in the digital twin implementation step S300, the actual digital twin 311, to which the actual signal system information is applied, and the virtual digital twin 312, to which the virtual signal system information is applied, are generated in the same traffic situation as the movement of vehicles at the actual intersection.

Figure 3A:
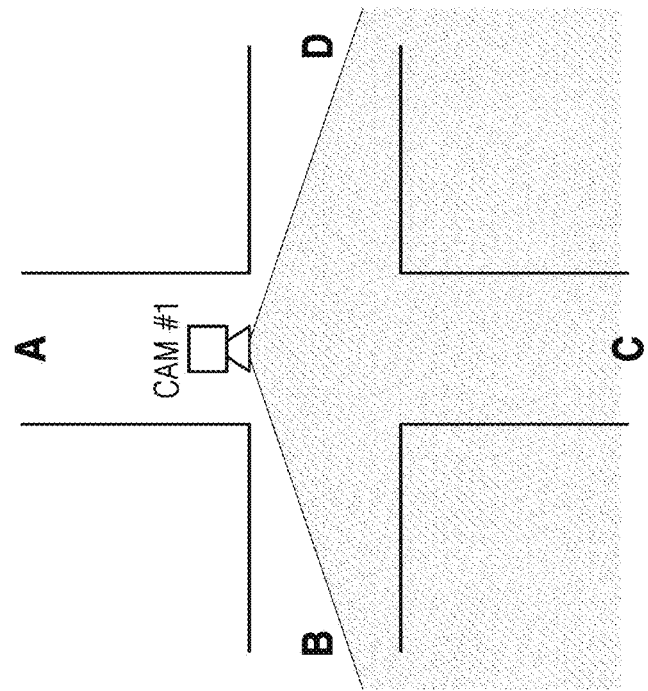
FIGS. 3A and 3B schematically illustrate a range of collecting traffic statistical information through cameras installed at an intersection according to one embodiment of the present invention.
Figure 3B:
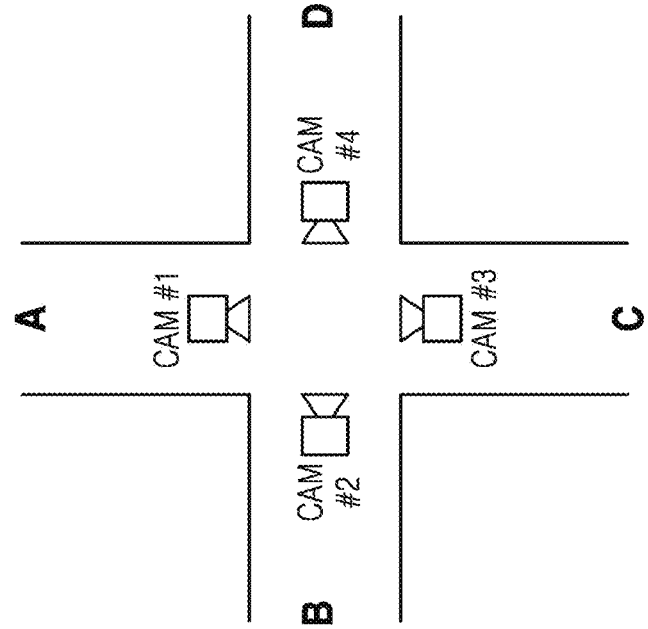

FIGS. 3A and 3B schematically illustrate a range of collecting traffic statistical information through cameras installed at an intersection according to one embodiment of the present invention.

Schematically, FIG. 3A illustrates one embodiment in which positions of cameras on each road at the intersection is displayed, and FIG. 3B illustrates one embodiment of capturing ranges of cameras installed at the intersection.

Specifically, as illustrated in FIG. 3A, cameras are installed at points facing each road, and the traffic statistical information generation unit 1100, which receives image information of the road in a direction in which each camera faces each road, generates traffic statistical information including traffic object information and intersection environment information required for simulation.

FIG. 3B illustrates a capturing range of any of the cameras installed on the intersection, but the capturing range may be changed due to the performance or aging of the camera, weather, and the like. However, in order to perform the present invention, a process of calculating the minimum value of the capturing range for each camera is required, and related contents thereof will be described in the description of FIG. 4C.

Figure 4A:
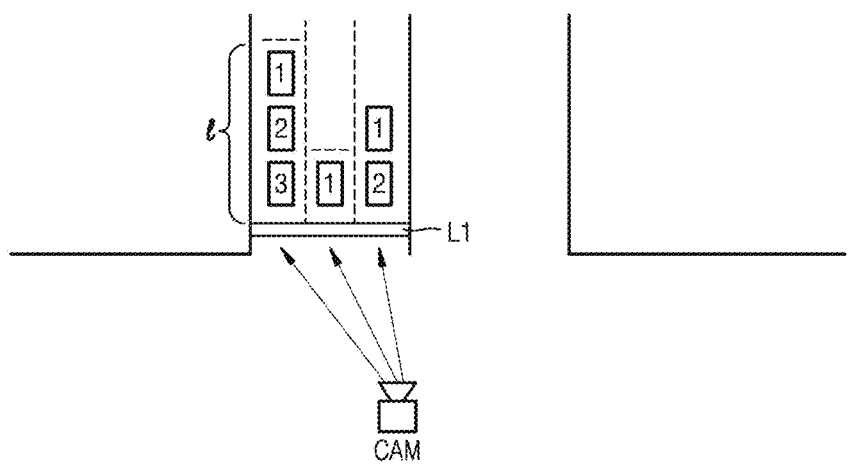
FIGS. 4A, 4B, and 4C schematically illustrate a process of performing a traffic statistical information generation step according to one embodiment of the present invention.
Figure 4B:
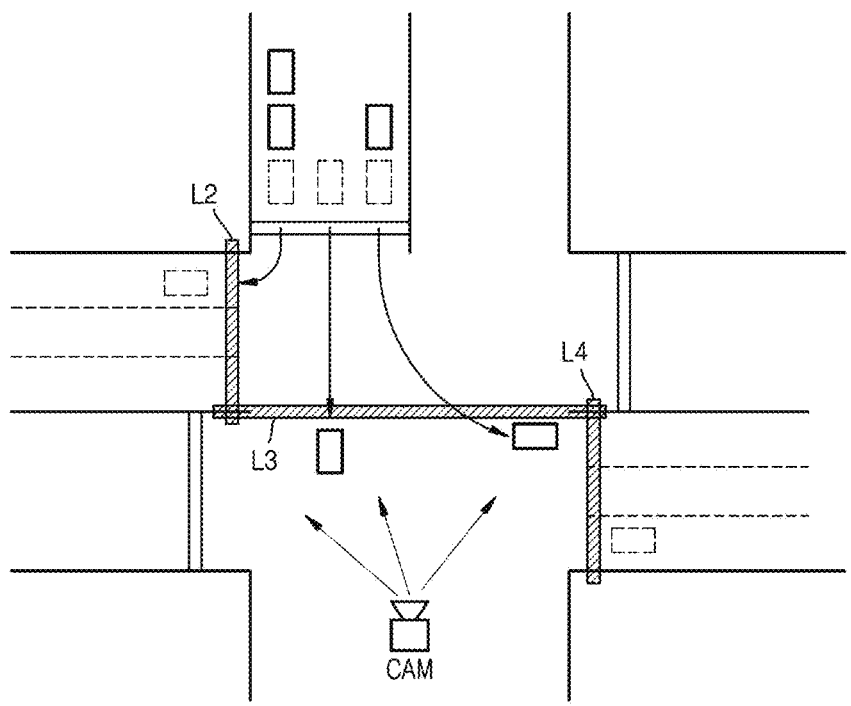
Figure 4C:
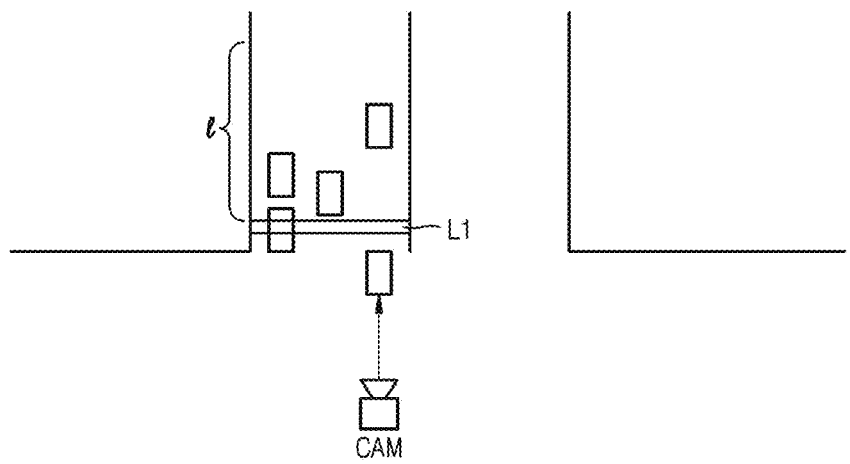

FIGS. 4A, 4B, and 4C schematically illustrate a process of performing a traffic statistical information generation step according to one embodiment of the present invention.

As illustrated in FIGS. 4A, 4B, and 4C, the traffic volume for each travel direction corresponds to the number of vehicles on the corresponding lane, which have moved to a lane of another road during the preset first cycle, a movement direction of the vehicle is determined based on that the vehicle passes through a reference line for each lane of the corresponding intersection, the traffic volume for each lane includes the number of vehicles which have passed through the corresponding intersection during the preset first cycle, and the traffic object information includes a length of a waiting queue of vehicles waiting in the corresponding lane, or the number of vehicles, and further includes waiting queue information for each lane in which the waiting queue of each lane is measured immediately before a signal is changed to a driving signal.

Schematically, FIG. 4A illustrates one embodiment in which the installed cameras measure the waiting queue information for each lane, FIG. 4B illustrates one embodiment in which the installed cameras measure the traffic volume for each lane, and FIG. 4C illustrate one embodiment in which the installed cameras measure the traffic volume for each driving direction on the road.

In the embodiments illustrated in FIGS. 4B and 4C, unique identification information is assigned to each vehicle moving in real time through the cameras, and the traffic object information including the traffic volume for each lane and the traffic volume for each driving direction of each vehicle during the preset first period is derived while tracking the movement of the vehicle on a plurality of image information input to the simulator in real time.

Specifically, as illustrated in FIG. 4A, the waiting queue information for each lane of the corresponding lane is based on a length 1 of a vehicle waiting queue in which the vehicles wait in the corresponding lane. Meanwhile, the length of the vehicle waiting queue may be affected by the type of vehicle. For example, in the case of a large bus or a truck, even if there are only a few buses or trucks, it may be recognized that the traffic jam has occurred due to the long vehicle queue, so that the waiting queue information for each lane further includes the number of vehicles. When the length of the vehicle waiting queue or the number of vehicles is increased, the user may determine that a possibility of traffic jam in the corresponding lane has increased.

Meanwhile, it is a preset rule that the corresponding vehicle is not included in the vehicle waiting queue when the vehicle passes a stop line L1, but actually, many drivers frequently stop over the stop line during signal waiting, so that the reference line for measuring a traffic volume is set to a range wider than that of the actual stop line by adding a slight allowable range to the stop line L1.

As illustrated in FIG. 4B, the traffic volume for each lane of the corresponding lane is based on the number of vehicles passing through the stop line L1 of the corresponding lane. Likewise, since the drivers frequently stop over the stop line, the reference line for measuring the traffic volume is set to a range wider than that of the actual stop line by adding a slight allowable error range to the stop line L1.

As illustrated in FIG. 4C, the traffic volume for each driving direction of the corresponding lane includes the number of vehicles in the lane for each driving direction divided by the corresponding road. However, since some intersections include a concurrent lane such as a lane that enables both straight-forward and left turn and a lane that enables both straight-forward and right turn, the concurrent lane has the overlapped driving directions. Thus, there is a clear limitation in measuring the traffic volume for each direction using the method based on the stop line L1 as illustrated in FIG. 4B. To solve the problem, a reference line of an intersection for each driving direction is set.

Specifically, FIG. 4C illustrates one embodiment of the present invention, in which a right-turn vehicle makes a right turn past the stop line and passes a virtual line L2 to be measured as a traffic volume of a right driving direction, and a straight-forward vehicle drives straight past the stop line and passes a virtual line L3 to be measured as a traffic volume of a left driving direction, and a left-turn vehicle makes a left turn past the stop line and passes a virtual line L4 to be measured as a traffic volume of a left driving direction. As described above, for the present invention, a minimum value of the capturing range of the camera has to be calculated, and in FIG. 4C, the minimum value of the capturing range is selected as a range in which all the cases in which images of the vehicles passing the virtual lines L2, L3, and L4 may be captured, so that it is preferable that the traffic volume for each driving direction may be measured. In addition, FIG. 4C is one embodiment of the present invention, in which positions of the virtual lines L2, L3, and L4 are not limited thereto, and may vary depending on the intersection geographic information or user's determination criteria. As an example, in FIG. 4C, when the left-turn vehicle passes the virtual line L3, it may be recognized as a straight-forward vehicle, and thus, it may be necessary to adjust the positions of the virtual lines L3 and L4, such as setting the virtual line L4 as a center line in a vertical direction.

Meanwhile, the waiting queue information for each lane corresponding to FIG. 4A is based on information obtained by measuring the waiting queue of the corresponding lane immediately before the signal of the lane is changed to the driving signal, and the traffic volume for each driving direction and the traffic volume for each lane corresponding to FIGS. 4B and 4C are based on information obtained by measuring the traffic volume for the preset first cycle.

FIG. 5 schematically illustrates a process of setting a signal system cycle of the intersection according to one embodiment of the present invention.

As illustrated in FIG. 5, the preset first cycle is set based on an actual signal system cycle of the corresponding intersection.

The information used in the conventional traffic simulator is implemented based on statistics of past traffic information collected, and the traffic situation predicted in the conventional traffic simulator is inevitably inconsistent with a traffic situation that changes from time to time at the actual intersection. To solve the problem, the technical feature of the present invention is to collect traffic object information that changes from time to time at the actual intersection in real time and implement the same as the digital twin 300. However, there are large amounts of computing resources required to match movements of vehicles changed in real time to the digital twin 300 as they are. To solve the problem, traffic statistic information is input to the simulator 1210 using the preset first cycle that is different from a cycle used in the conventional traffic simulator, and twin base information is input to the digital twin 300 using a second cycle that is shorter than the preset first cycle. A detailed description of the second cycle will be described later in FIG. 6.

As illustrated in FIG. 5, a signal system of a road in a direction in which the cameras installed at each road face is listed, and as mentioned in FIG. 3A, CAM #1 indicates a signal system for controlling vehicles in a driving lane of road C, CAM #2 indicates a signal system for controlling vehicles in a driving lane of road D, CAM #3 indicates a signal system for controlling vehicles in a driving lane of road A, and CAM #4 indicates a signal system for controlling vehicles in a driving lane of road B. Based on one signal system (CAM #1 for capturing an image of road C), a circulation cycle ((1)→(2)→(3)→(4)) of the signal system captured by the CAM #1 is set as a preset first cycle of the corresponding intersection. The configuration for setting a period for measuring the circulation cycle of the signal system may easily measure a traffic volume changing in real time because the vehicles at the actual intersection move according to the signal system of the intersection.

Figure 6:
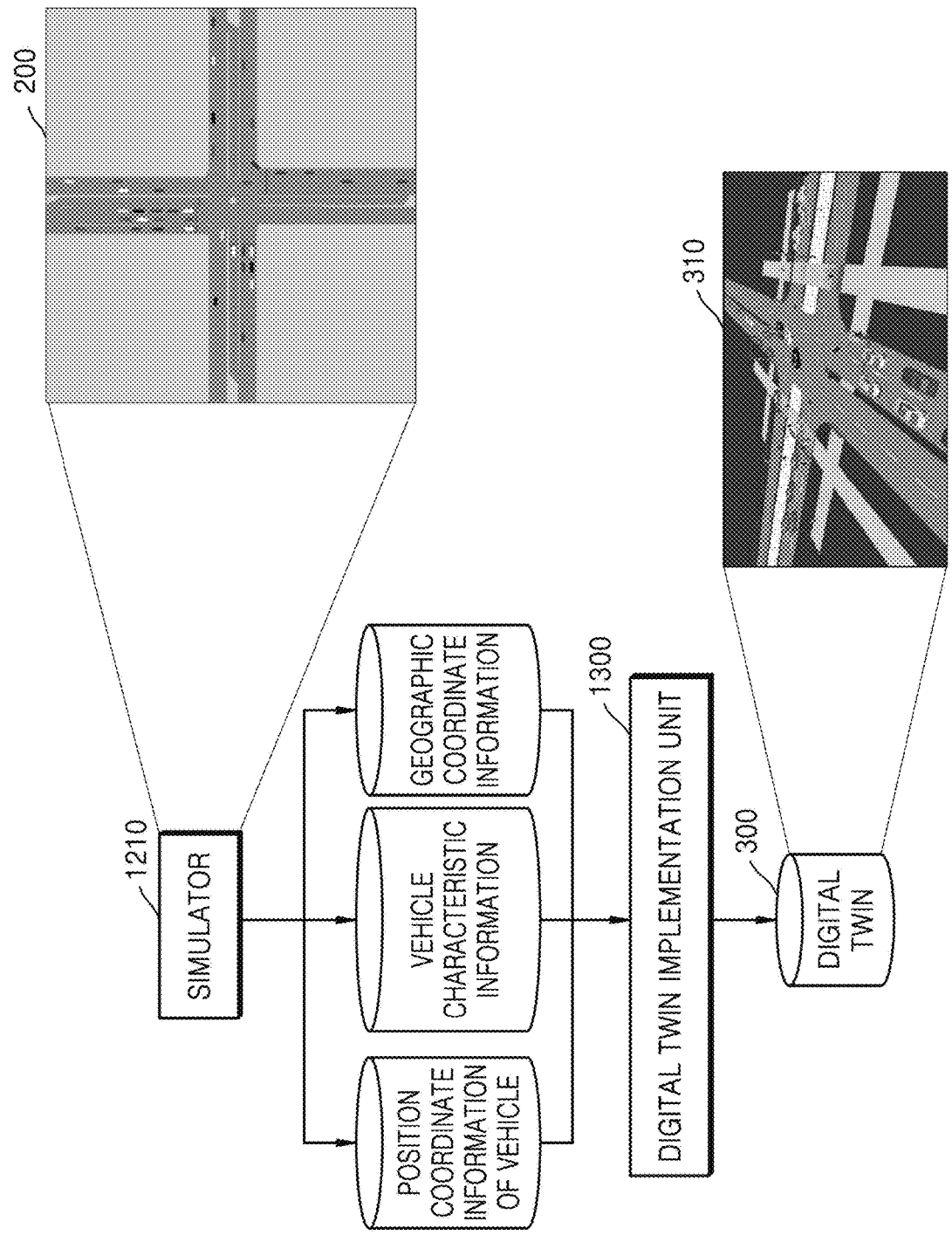
FIG. 6 schematically illustrates a process of performing a twin base information derivation step and a digital twin implementation step according to one embodiment of the present invention.

FIG. 6 schematically illustrates a process of performing the twin base information derivation step S200 and the digital twin implementation step S300 according to one embodiment of the present invention.

As illustrated in FIG. 6, the twin basic information includes position coordinate information, vehicle characteristic information, and geographic coordinate information corresponding to intersection geographic information, based on a preset coordinate system. In the digital twin implementation step S300, a 3D digital twin is implemented by applying the vehicle characteristic information with a 3D vehicle model mapped according to a preset rule to each vehicle in the twin basic information and displaying the corresponding 3D vehicle model at a position corresponding to the position coordinate information of the corresponding vehicle.

As illustrated in FIG. 6, the 3D digital twin outputs the intersection and the traffic statistical information as well as the vehicle model as a 3D graphic, but is not limited thereto, and may output the traffic statistical information as a 2D graphic according to the user's input setting. In addition, as another embodiment of the present invention, the 3D vehicle model of the corresponding vehicle may be applied to a position corresponding to the position coordinate information of the vehicle displayed on the 2D simulation and output the 3D vehicle model as a 3D graphic.

The geographic coordinate information corresponds to geographic information of the actual intersection, and includes the type or shape of intersections, such as a T-shaped and cross (+)-shaped intersections, a width of the road, and the like. Meanwhile, the geographic coordinate information is the intersection geographic information obtained through the plurality of cameras installed at the corresponding intersection, and is not input again after inputting the geographic coordinate information to the digital twin 300 at the initial stage, thereby reducing computer resources. According to another embodiment of the present invention, unlike the traffic object information that changes in real time, the intersection geographic information and the geographic coordinate information are fixed information, so that an information input device is not limited to the camera installed at the intersection, but may edit and process information pre-stored in an external database and input the information to the simulator 1210.

Meanwhile, a process of tracking positions of vehicle objects that change from time to time at the actual intersection, mapping the positions to the digital twin 300 in a one-to-one manner, and implementing the actual traffic situation has a problem in that the demand for computing resources is too large.

According to the embodiment of the present invention to solve the above problem, first, the traffic statistical information configured with the preset first cycle is input to the simulator 1210. Thereafter, a traffic situation of the simulator 1210 is implemented as vehicles included in the traffic object information move according to the signal system information input to the simulator 1210. In this case, since position coordinates of the vehicle objects are changed at every time shorter than the predetermined first cycle, the twin basis information output from the simulator 1210 is configured with a second cycle that is shorter than the predetermined first cycle in order to include position coordinates of the vehicle objects moving at every short time.

That is, as compared with a method for mapping the positions of vehicles moving at the actual intersection in a one-to-one manner, a method for inputting a traffic volume measured during the preset first cycle to the simulator 1210, and inputting position coordinates of vehicles moving in the simulator 1210 to the digital twin 300 by including the twin base information configured with a second cycle shorter than the first cycle may reduce computing resources.

Figure 7A:
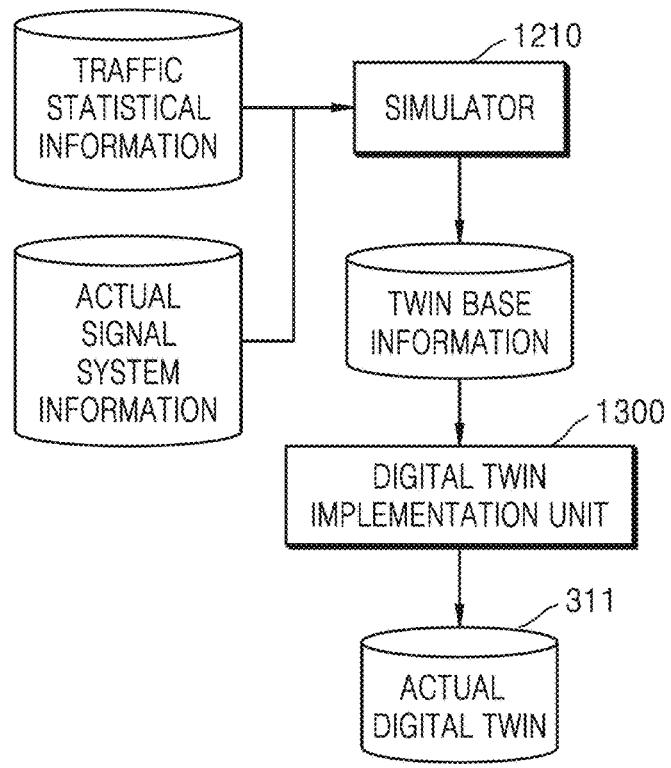
FIGS. 7A and 7B schematically illustrate a process of performing a digital twin implementation step according to one embodiment of the present invention.
Figure 7B:
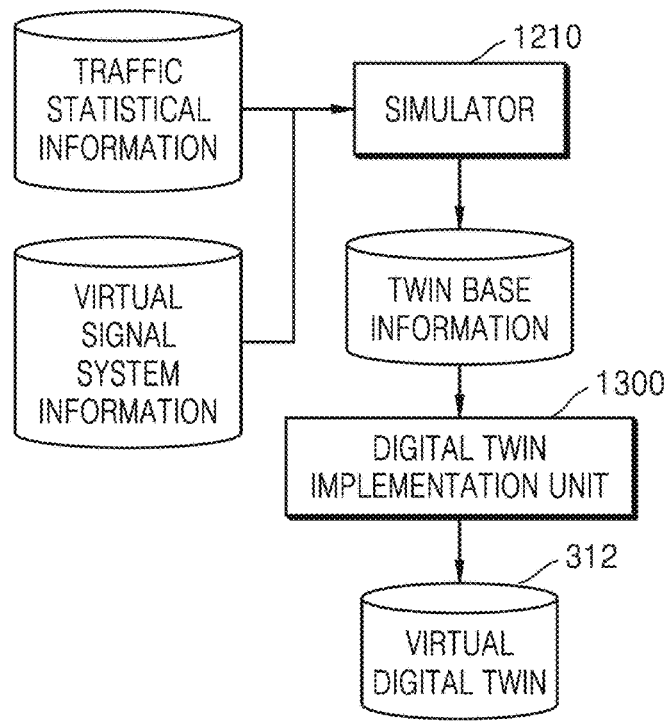

FIGS. 7A and 7B schematically illustrate a process of performing a digital twin implementation step according to one embodiment of the present invention.

As illustrated in FIGS. 7A and 7B, the digital twin implementation step S300 includes a step of generating the actual digital twin 311 generated based on the intersection environment information including the traffic object information of the actual intersection and the actual signal system information of the corresponding intersection; and a step of generating the virtual digital twin 312 generated based on the intersection environment information including the traffic object information of the actual intersection and the virtual signal system information of the corresponding intersection.

Schematically, FIG. 7A illustrates a process of generating the actual digital twin 311, and FIG. 7B illustrates a process of generating the virtual digital twin 312.

Specifically, FIG. 7A illustrates a process of inputting the actual traffic statistical information of the actual intersection and the actual signal system information to the simulator 1210 to derive twin base information through the twin base information derivation unit 1200, and inputting the twin base information to the digital twin 300 by the digital twin implementation unit 1300 to generate the actual digital twin 311 implementing the same environment as the actual traffic situation of the actual intersection. As described above, the simulator 1210 is included in the twin base information derivation unit 1200.

Specifically, FIG. 7B illustrates a process of inputting the actual traffic statistical information of the actual intersection and the virtual signal system information generated by the user to the simulator 1210 to derive twin base information through the twin base information derivation unit 1200, and inputting the twin base information to the digital twin 300 by the digital twin implementation unit 1300 to generate the virtual digital twin 312 implementing a traffic situation environment that changes in real time corresponding to the virtual signal system information. Similarly, the simulator 1210 is included in the twin base information derivation unit 1200.

The virtual signal system information includes signal display time information and signal display order information included in the actual signal system information, which is changed by the user, and the unit of the virtual signal system information corresponds to the preset first cycle.

The signal display time information included in the virtual signal system information is obtained by manipulating a display time of a specific signal, and when the user determines that traffic jam of the corresponding lane is severe, the traffic jam of the entire intersection may be alleviated by increasing a driving signal time of the corresponding lane and correspondingly increasing a stop signal time of the lane in which traffic jam is not relatively severe.

Furthermore, the signal display order information included in the virtual signal system information is obtained by manipulating a display order of the specific signal, and when the user determines that traffic jam in the corresponding lane is severe, the traffic jam may be alleviated by a method for outputting at least one driving signal to the corresponding lane within the preset first period or a method for outputting a driving signal to the corresponding lane first by changing the order of the stop signal in which a pre-output is scheduled and a driving signal in which a post-output is scheduled.

Figure 8:
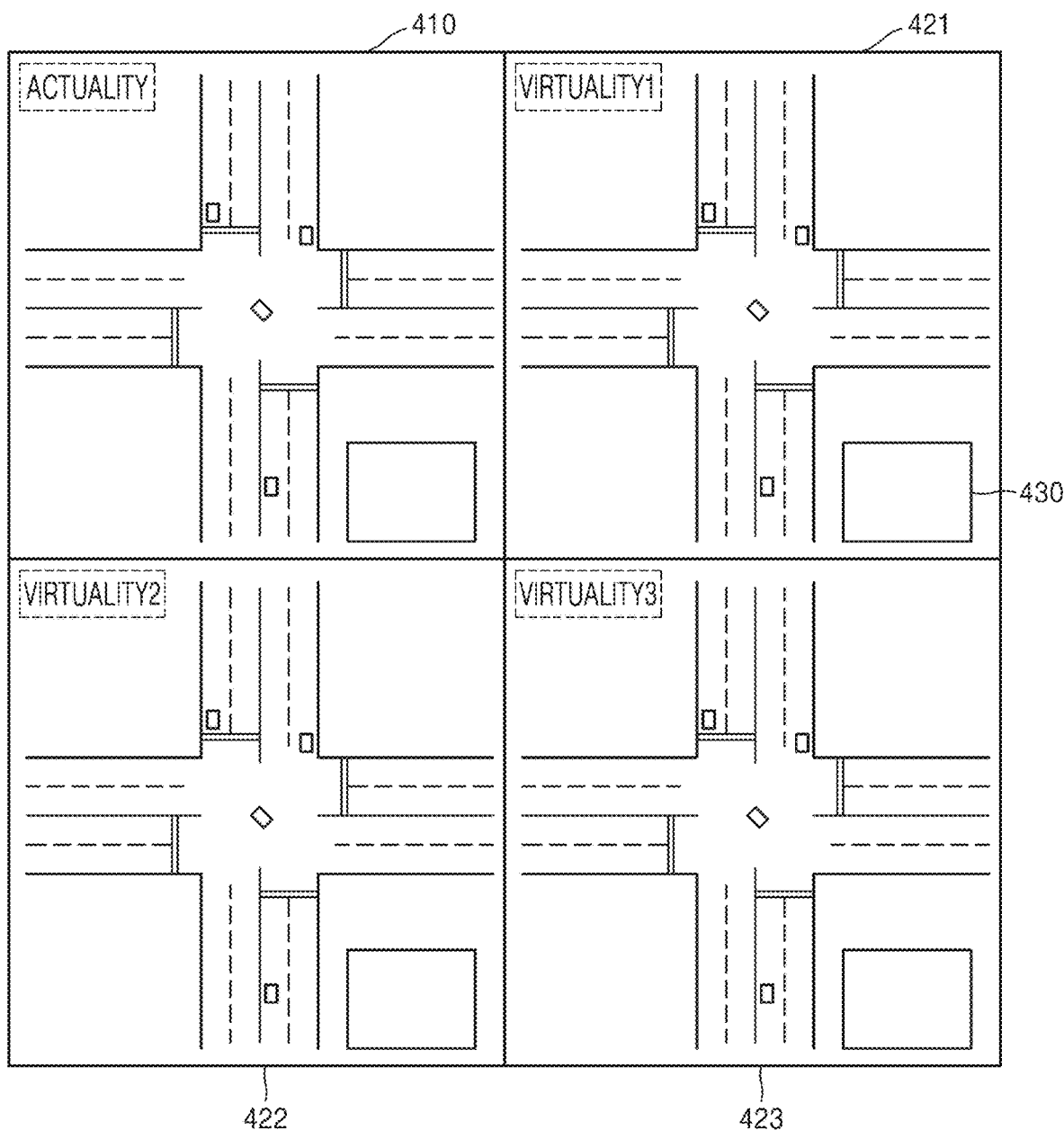
FIG. 8 illustrates a screen of a user terminal on which results of a digital twin comparison step are displayed according to one embodiment of the present invention.

FIG. 8 illustrates a screen of the user terminal on which results of the digital twin comparison step S400 are displayed according to one embodiment of the present invention.

As illustrated in FIG. 8, the method for implementing a real-time traffic situation as the digital twin further includes the digital twin comparison step S400 of comparing the actual digital twin 311, to which the actual signal system information is applied, with the virtual digital twin 312, to which one or more virtual signal system information input by the user is applied. Further, the digital twin comparison step S400 provides the user with a comparison interface including one existing image layer 410 for outputting a graphical output value of the actual digital twin 311, and one or more comparison image layers 421, 422, and 423, and hereinafter, referred to as 420) for outputting graphical output values of one or more virtual digital twins 312, in which the comparison interface simultaneously displays the existing image layer 410 and the one or more comparison image layers 420.

Specifically, the user recognizes the traffic jam through the existing image layer 410 in which the actual traffic situation is implemented in real time, and inputs virtual signal system information capable of alleviating the traffic jam to the simulator 1210. The digital twin 300 simultaneously outputs the one or more comparison image layers 420 and the existing image layer 410, on which situations predicted in response to the virtual signal system information are output, to the user terminal 2000, thereby allowing the user to easily recognize how effective the virtual signal system information is in comparison with the actual signal system information. Accordingly, the user may find optimal signal system information corresponding to the real-time traffic situation.

Further, as illustrated in FIG. 8, the existing image layer 410 and the one or more comparison image layers 420 include a detailed information layer 430 for displaying detailed information of the corresponding digital twin 300. A detailed description of the detailed information will be described later in FIG. 9.

Meanwhile, the existing image layer 410 and the comparison image layer 420 may change their viewpoints according to a setting of the digital twin 300, and may be displayed as a 3D graphic, but FIG. 8 illustrates a viewpoint of facing down at an intersection from above and a 2D graphic according to one embodiment of the present invention. In this case, the present invention may provide a service capable of changing the viewpoint and graphics of the digital twin 300 according to the user so that the user may easily recognize the traffic situation that changes in real time. Further, one existing image layer 410 and three comparison image layers 420 are illustrated by dividing the screen of the user terminal 2000 into four through the comparison interface, but the present invention is not limited thereto, and the number of the comparison image layers 420 may be decreased or increased according to the number of the virtual signal system information input by the user or the performance of the computing system 1000 implementing the digital twin 300.

Similarly, in layouts of the existing image layer 410, the one or more comparison image layers 420, and the detailed information layer 430 illustrated in FIG. 8, the detailed information layer 430 is disposed in the existing image layer 410 and the right lower end of the one or more comparison image layers 420, but the present invention is not limited thereto, and the detailed information layer 430 may be configured in various forms of layouts in which the detailed information layer 430 is disposed without being interrupted as the user recognizes information of the existing image layer 410 and the one or more comparison image layers 420. According to another embodiment of the present invention, the information displayed on the detailed information layer 430 may be provided by an interface independent of the comparison interface.

Figure 9:
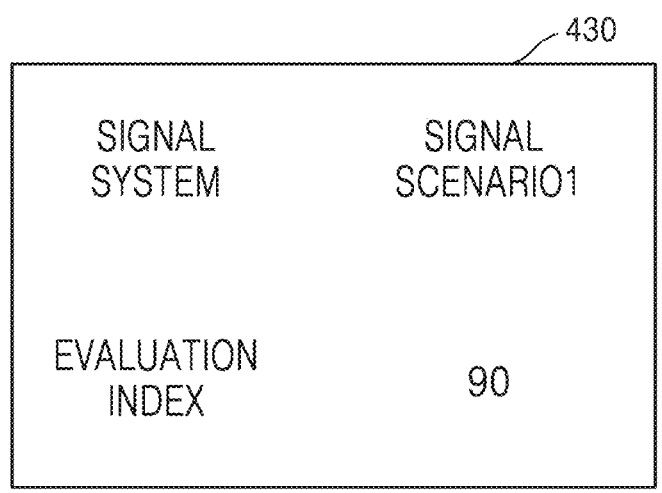
FIG. 9 illustrates a screen displayed on a user terminal including signal system information of a corresponding digital twin and evaluation indices according to one embodiment of the present invention.

FIG. 9 illustrates a screen displayed on the user terminal 2000 including the signal system information of the corresponding digital twin 300 and evaluation indices according to one embodiment of the present invention.

As illustrated in FIG. 9, the existing image layer 410 and the one or more comparison image layers 420 include the detailed information layer 430 that displays the signal system information of the corresponding intersection in the corresponding digital twin 300 and the evaluation index related to the delay time occurring during the operation at the signal intersection in the corresponding digital twin 300.

Specifically, the signal system written in the detailed information layer 430 on the existing image layer 410 displays a name indicating actual signal system information of the actual digital twin 311, and the signal system written in the detailed information layer 430 on the comparison image layer 420 displays a name indicating virtual signal system information of the virtual digital twin 312. Each of the names is not limited to one embodiment of FIG. 9, and may be directly created by the user. In addition, an evaluation index value for calculating a degree of traffic jam occurring in real time at the corresponding intersection is displayed on the evaluation index. The evaluation index corresponds to an index obtained by digitizing the degree of traffic jam generated according to the signal system at the corresponding intersection according to a predetermined rule, and the degree of traffic jam is derived based on a congestion amount for each lane and a congestion amount for each direction of each road. The higher the evaluation index, the more severe the traffic jam is, and the lower the evaluation index, the less severe the traffic jam is at the corresponding intersection.

Meanwhile, according to one embodiment of the present invention, as illustrated in FIG. 9, the user refers to the evaluation index shown in each of the existing image layer 410 and the comparison image layer 420 to select a virtual signal system that causes less traffic jam than the actual signal system, and reflects the virtual signal system in the actual signal system of the corresponding intersection, so that it is possible to induce a smoother traffic flow than before.

In the comparison interface, a preset name is displayed on the left upper end of the existing image layer 410 and the one or more comparison image layers 420 by a predetermined rule, and the actual digital twin 311 and the one or more virtual digital twin 312 may be easily distinguished from each other through the name of the signal system and the evaluation index value applied to the corresponding digital twin 300 written in the detailed information layer 430, and the signal system being applied may be quickly recognized, so that it is possible to quickly find the optimal signal system.

Figure 10:
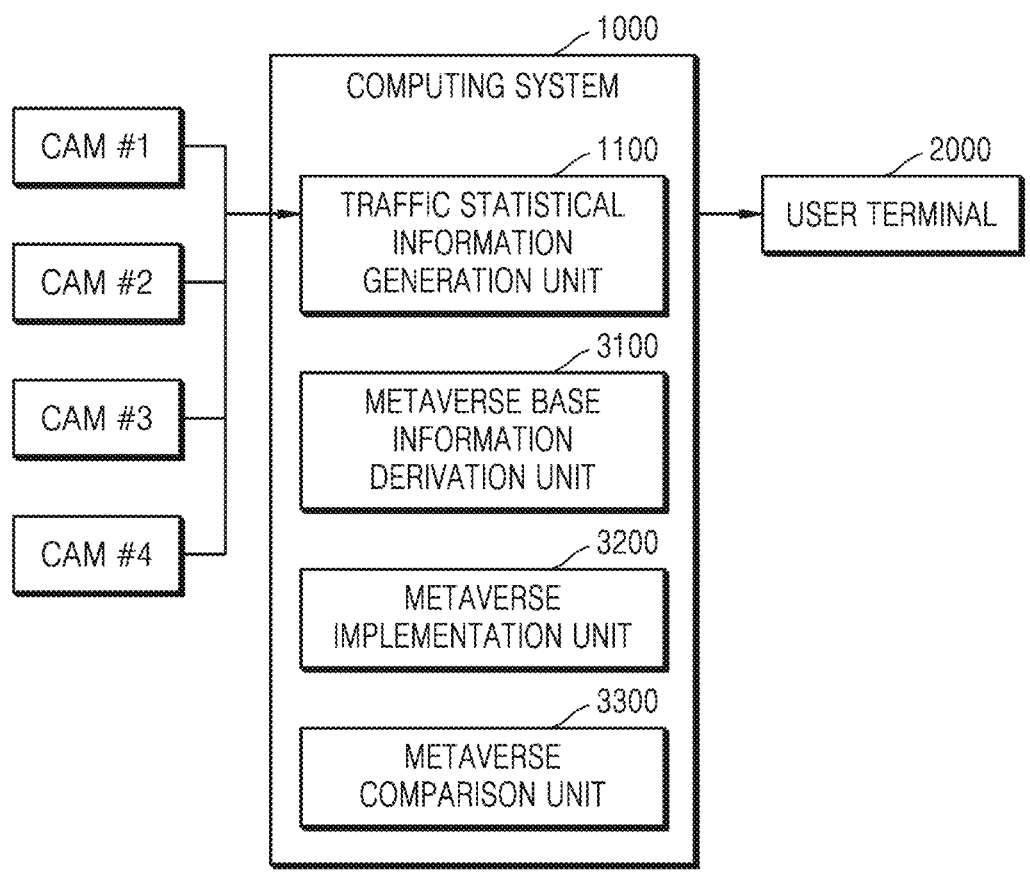
FIG. 10 schematically illustrates constituent elements for performing a method for implementing a real-time traffic situation using a metaverse according to one embodiment of the present invention.

FIG. 10 schematically illustrates constituent elements for performing the method for implementing a real-time traffic situation using a metaverse according to one embodiment of the present invention.

As illustrated in FIG. 10, there is provided a system for implementing a real-time traffic situation as a metaverse, which is performed in a computing system 1000 including one or more memories and one or more processors, in which the system includes: a traffic statistical information generation unit 1100 which receives image information in real time through cameras installed at points facing each road of the intersection to derive traffic object information including traffic volume for each driving direction and traffic volume for each lane on a corresponding road at a preset first cycle, and to generate traffic statistical information including the traffic object information and intersection environment information including signal system information of a corresponding intersection; a metaverse base information derivation unit 3100 which inputs the traffic statistical information, which is generated in a unit of the preset first cycle, to a simulator, and derives metaverse base information, which is used to implement metaverse of the intersection in real time, from the simulator in a second cycle shorter than the first cycle; and a metaverse implementation unit 3200 which implements a traffic situation of the intersection as graphical metaverse based on the metaverse base information, in which one or more users may access the metaverse implemented by the metaverse implementation unit 3200 to provide a virtual driving experience in a corresponding traffic environment, and the preset first cycle is set based on an actual signal system cycle of the corresponding intersection.

A method for implementing a real-time traffic situation as a metaverse may be performed by the computing system 1000 illustrated in FIG. 10, the method for implementing a real-time traffic situation as a metaverse further includes a metaverse comparison step of comparing actual metaverse, to which actual signal system information is applied, with virtual metaverse, to which one or more virtual signal system information is applied.

Specifically, the metaverse base information derivation unit 3100 performs a metaverse base information derivation step. More specifically, in the metaverse base information derivation step, metaverse base information is derived by inputting the traffic statistical information generated in the traffic statistical information generation step to the simulator 1210. The metaverse base information includes: position coordinate information of vehicles moving on the corresponding intersection; vehicle characteristic information; and geographic coordinate information corresponding to intersection geographical information of the corresponding intersection, based on a preset coordinate system of the simulator 1210.

The metaverse implementation unit 3200 performs a metaverse implementation step. Specifically, in the metaverse implementation step, metaverse is implemented based on the metaverse base information generated in the simulator 1210. Since traffic statistical information input in real time is reflected through the metaverse implementation step unlike the conventional traffic simulation, a traffic situation that matches the traffic situation at the actual intersection is implemented.

Further, in the metaverse implementation step, an actual metaverse, to which actual signal system information is applied, and a virtual metaverse, to which virtual signal system information is applied, are generated in the same traffic situation as the movement of vehicles at the actual intersection. Specifically, the one or more users who access the metaverse experience driving in the actual metaverse, and when the users feel a traffic jam, one or more virtual signal system information that may solve the traffic jam is generated. The one or more users may experience not only the virtual metaverse to which the virtual signal system information created by the users is applied, but also the virtual metaverse created by other users other than the users.

The metaverse comparison step is performed by the metaverse comparison unit 3300 of the system implementing the metaverse. Specifically, in the metaverse comparison step, one or more users drive a vehicle directly in the actual metaverse and the virtual metaverse or share a review of the experience to compare the virtual signal system information created by the users. That is, by comparing the virtual signal system information created by the users, optimal signal system information that may most efficiently solve traffic jam caused by the actual metaverse may be found, and the degree of traffic jam may be minimized by applying the optimal signal system information to the actual intersection by the user.

According to one embodiment of the present invention, the metaverse base information derivation unit 3100 and the metaverse implementation unit 3200 illustrated in FIG. 10 are physically located in the same space together with the twin base information derivation unit 1200, the digital twin implementation unit 1300, and the digital twin comparison unit 1400. However, according to another embodiment of the present invention, the metaverse base information derivation unit 3100 and the metaverse implementation unit 3200 may be located at spaces that are physically separated from the twin base information derivation unit 1200, the digital twin implementation unit 1300, and the digital twin comparison unit 1400, and may transmit and receive information to and from each other through wired or wireless communication.

Figure 11A:
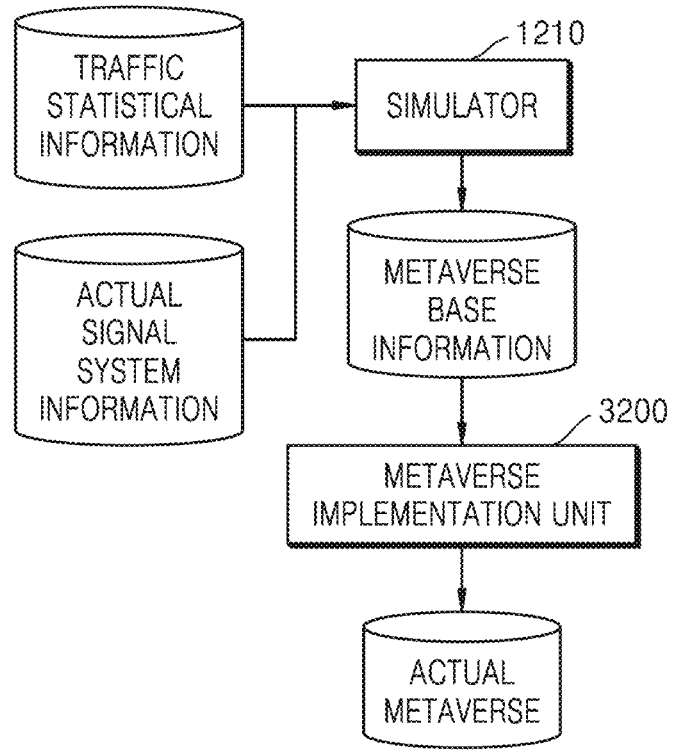
FIGS. 11A and 11B schematically illustrate a process of performing a metaverse implementation step according to one embodiment of the present invention.
Figure 11B:
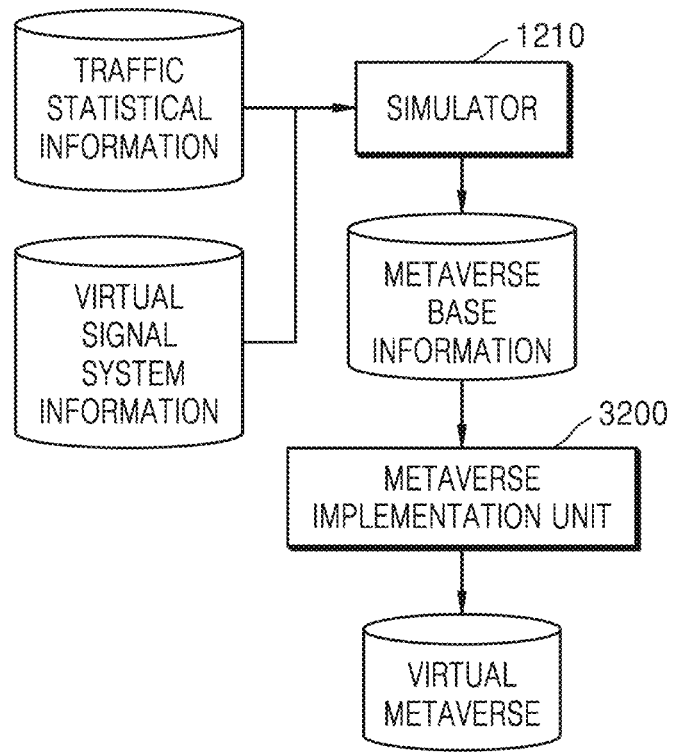

FIGS. 11A and 11B schematically illustrate a process of performing a metaverse implementation step according to one embodiment of the present invention.

As illustrated in FIGS. 11A and 11B, the metaverse implementation step includes: a step of generating actual metaverse generated based on intersection environment information including traffic object information of the actual intersection and the actual signal system information of the corresponding intersection; and a step of generating one or more virtual metaverses generated based on intersection environment information including the traffic object information of the actual intersection and virtual signal system information of the corresponding intersection, in which the user experiences virtual driving in the metaverse in which a traffic environment is implemented, and changes the virtual signal system information to input the changed signal system information to the computing system, thereby changing the virtual metaverse.

The metaverse implementation step is performed by the metaverse implementation unit 3200. Schematically, FIG. 11A illustrates a process of generating an actual metaverse, and FIG. 11B illustrates a process of generating a virtual metaverse.

Specifically, FIG. 11A illustrates a process of generating the actual metaverse by inputting actual traffic statistical information of the actual intersection and the actual signal system information to the simulator 1210 to derive metaverse base information through the metaverse base information derivation unit 3100, and inputting the metaverse base information to the metaverse by the metaverse implementation unit 3200 to implement the same environment as the actual traffic situation of the actual intersection. The metaverse base information derivation unit 3100 includes the simulator 1210.

Specifically, FIG. 11B illustrates a process of generating the virtual metaverse by inputting actual traffic statistical information of the actual intersection and the virtual signal system information generated by a metaverse user to the simulator 1210 to derive metaverse base information through the metaverse base information derivation unit 3100, and inputting the metaverse base information to the metaverse by the metaverse implementation unit 3200 to implement a traffic situation that changes according to the virtual signal system information. The metaverse base information derivation unit 3100 includes the simulator 1210.

The metaverse may refer to a three-dimensional virtual world such as a real world, and a user of the metaverse may use his or her avatar to perform an activity similar to the real world in the metaverse. In one embodiment of the present invention, one or more users using the actual metaverse and the virtual metaverse may drive a vehicle within the metaverse using their avatars. The one or more users may drive their own vehicles at the intersection in the actual metaverse according to the actual signal system information, and may generate virtual signal system information capable of solving the traffic jam experienced by the one or more users to apply the virtual signal system information to new virtual metaverse, and the one or more users may participate in the virtual metaverse created by the users and experience various virtual signal system information.

Figure 12:
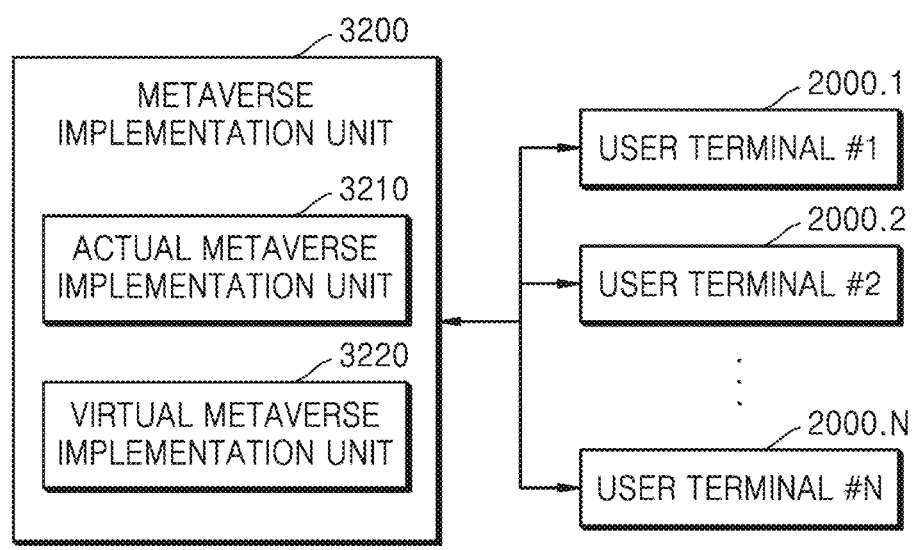
FIG. 12 schematically illustrates constituent elements for performing a metaverse comparison step according to one embodiment of the present invention.

FIG. 12 schematically illustrates constituent elements for performing a metaverse comparison step according to one embodiment of the present invention.

As illustrated in FIG. 12, a method for implementing the metaverse may further include a metaverse comparison step of comparing actual metaverse, to which actual signal system information is applied, with virtual metaverse, to which one or more virtual signal system information input by the user are applied.

Specifically, the metaverse implementation unit 3200 includes an actual metaverse implementation unit 3210 and a virtual metaverse implementation unit 3220, in which the actual metaverse implementation unit 3210 generates the actual metaverse and the virtual metaverse implementation unit 3220 generates one or more virtual metaverses. One or more users access the actual metaverse and the one or more virtual metaverses through user terminals 2000.1 to 2000.N (hereinafter, referred to as 2000). Within the metaverse, one or more users experience traffic flow by driving within the intersection of the actual metaverse and one or more virtual metaverses using their own avatars.

In the metaverse comparison step, a degree of traffic jam experienced by one or more users in the actual metaverse is compared with a degree of traffic jam experienced by one or more virtual metaverses created by each other, and optimal signal system information that is being applied to the virtual metaverse a with smooth traffic flow is found. As the number of users participating in the metaverse increases, the virtual signal system information to be derived becomes more diverse, so that it is possible to more easily find the optimal signal system information.

In another embodiment of the present invention, one or more participating users, in addition to the user, may create a new virtual signaling system information and communicate with one or more users operating the metaverse to create a new virtual metaverse, and the one or more users and the one or more participating users may also participate in the virtual metaverse to experience the corresponding virtual signaling system. In addition, the metaverse user may easily find the optimal signal system information that may solve the traffic jam based on communication with the participating users while facing the traffic flow that the participating users are experiencing.

2. Method and System for Calculating and Comparing Evaluation Indices for Signal System of Intersection "2. Method And System for Calculating And Comparing Evaluation Indices for Signal System of Intersection", which will be described later, corresponds to a method for alleviating a traffic jam occurring at the corresponding intersection by efficiently comparing the actual digital twin with the virtual digital twin derived from "1. Method And System for Implementing Real-time Traffic Situation As Digital Twin And Metaverse".

Figure 13:
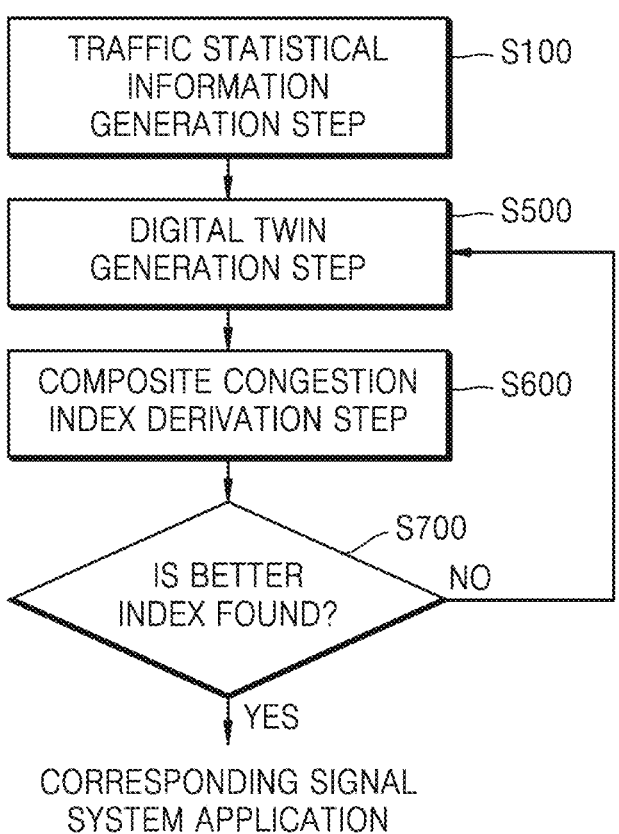
FIG. 13 schematically illustrates detailed steps of a method for calculating and comparing evaluation indices for a signal system of an intersection according to one embodiment of the present invention.

FIG. 13 schematically illustrates detailed steps of a method for calculating and comparing evaluation indices for a signal system of an intersection according to one embodiment of the present invention.

As illustrated in FIG. 13, there is provided a method for calculating and comparing evaluation indices for a signal system of an intersection, which is performed in a computing system 1000 including one or more memories and one or more processors, in which the method includes: a traffic statistical information generation step S100 of receiving image information in real time through cameras installed at points facing each road of the intersection to derive traffic object information including traffic volume for each driving direction and traffic volume for each lane on a corresponding road at a preset first cycle, and to generate traffic statistical information including the traffic object information and intersection environment information including signal system information of a corresponding intersection; a digital twin generation step S500 of inputting the traffic statistical information, which is generated in a unit of the preset first cycle, to a simulator 1210, and implementing a traffic situation of the intersection as a graphical digital twin 300 based on an output value of the simulator 1210; and a composite congestion index derivation step S600 of deriving a composite congestion index from each of an actual digital twin 311, to which actual signal system information is applied, and a virtual digital twin 312, to which virtual signal system information input by one or more users is applied, in which the evaluation indices are derived based on a congestion time of a predetermined number of vehicles at the corresponding intersection for a predetermined period of time.

Meanwhile, although it has been described that the detailed steps of the method for calculating and comparing evaluation indices for a signal system of an intersection according to one embodiment of the present invention are performed using the digital twin 300, the method for calculating and comparing evaluation indices using a metaverse is also the same. A detailed description thereof will be described in FIG. 14.

Additionally, the method for calculating and comparing evaluation indices for a signal system of an intersection further includes: an evaluation index calculation step of calculating an evaluation index as a total of composite congestion indices calculated from all lanes of the corresponding intersection; a comparison interface display step of transmitting, to a user terminal 2000, a comparison interface including one existing image layer 410 for outputting a graphical output value from the actual digital twin 311 and one or more comparison image layers 420 for outputting graphical output values from one or more virtual digital twins 312; and an evaluation index display step S700 of displaying, on a detailed information layer 430, an evaluation index corresponding to a traffic situation implemented as each digital twin 300 in the comparison interface, in which the detailed information layer 430 is included in each of the existing image layer 410 and the one or more comparison image layers 420, and the user selects one of digital twins 300 based on the evaluation index corresponding to the traffic situation implemented as each digital twin 300 so that a signal system of the digital twin 300 selected by the user is reflected in the signal system of the corresponding intersection. The more detailed description of the evaluation index calculation step and the comparison interface display step will be provided in the description of FIG. 17.

However, the digital twin generation step S500 includes the twin base information derivation step S200 and the digital twin implementation step S300.

The user may compare the respective evaluation indices displayed on the existing image layer 410 and one or more comparison image layers 420, and may reflect a signal system having the lowest evaluation index among the evaluation indices in actual signal system. When all of the evaluation indices displayed on the 1 or more comparison image layers 420 are higher than the evaluation index displayed on the existing image layer 410, the user may determine that the actual signal system being applied to the actual intersection is the most effective, and the user may generate another virtual signal system for a better signal system and input the virtual signal system to the simulator 1210, and the computing system 1000 repeatedly performs a process of calculating the evaluation index until the optimal signal system suitable for the real-time traffic situation of the corresponding intersection is derived through the digital twin generation step (S500).

Figure 14:
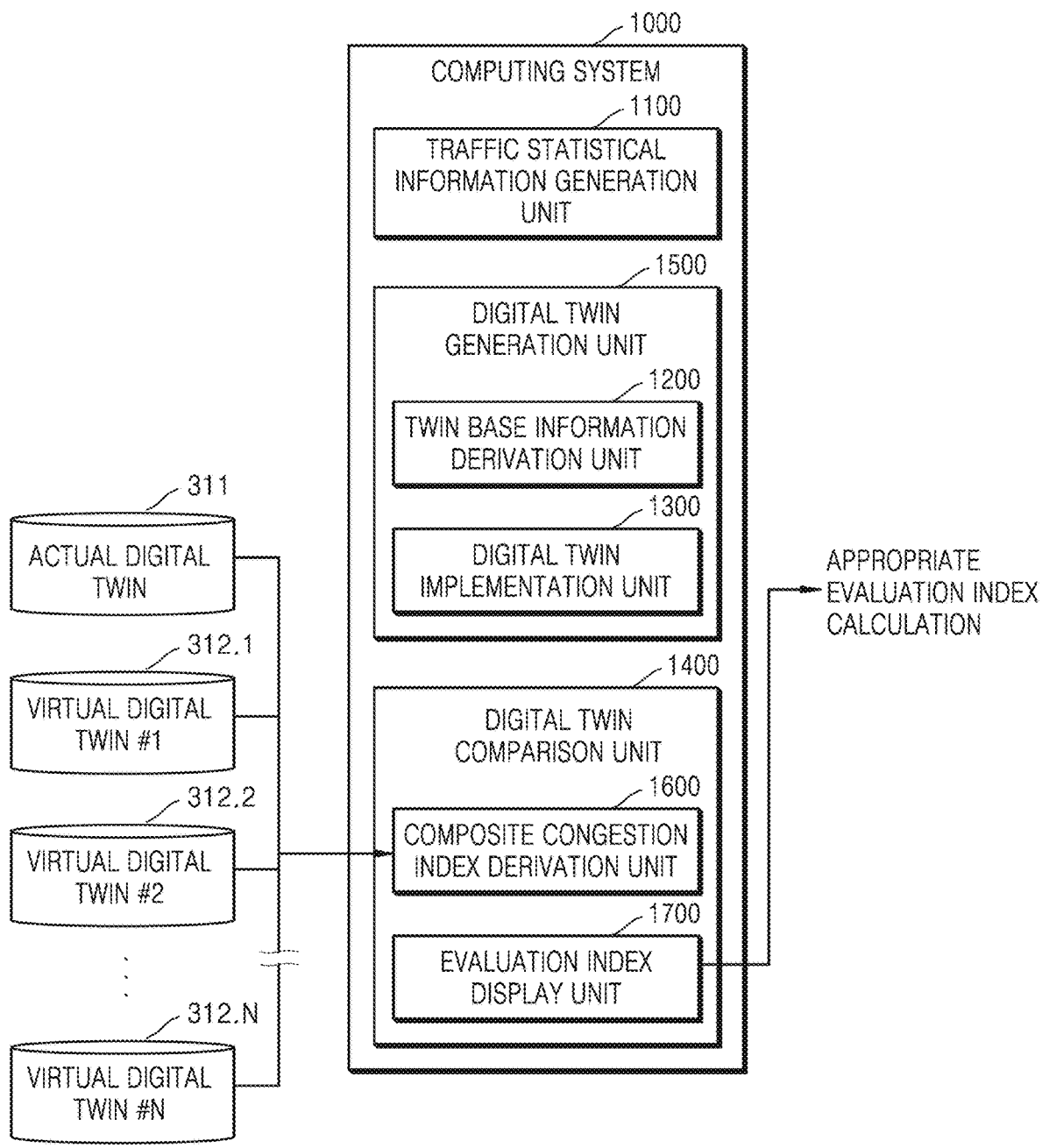
FIG. 14 schematically illustrates constituent elements of a computing system for performing the method for calculating and comparing evaluation indices for a signal system of an intersection according to one embodiment of the present invention.

FIG. 14 schematically illustrates constituent elements of a computing system for performing the method for calculating and comparing evaluation indices for a signal system of an intersection according to one embodiment of the present invention.

As illustrated in FIG. 14, there is provided a system for calculating and comparing evaluation indices, which includes one or more memories and one or more processors and performs a method for calculating and comparing evaluation indices for a signal system of an intersection, in which the system includes: a traffic statistical information generation unit 1100 which receives image information in real time through cameras installed at points facing each road of the intersection to derive traffic object information including traffic volume for each driving direction and traffic volume for each lane on a corresponding road at a preset first cycle, and to generate traffic statistical information including the traffic object information and intersection environment information including signal system information of a corresponding intersection; a digital twin generation unit 1500 which inputs the traffic statistical information, which is generated in a unit of the preset first cycle, to a simulator 1210, and implements a traffic situation of the intersection as a graphical digital twin 300 based on an output value of the simulator 1210; and a composite congestion index derivation unit 1600 which derives a composite congestion index from each of an actual digital twin 311, to which actual signal system information is applied, and virtual digital twins 312.1 to 312.N (hereinafter, referred to as 312), to which one or more virtual signal system information input by a user is applied, in which the evaluation indices are derived based on a congestion time of a predetermined number of vehicles at the corresponding intersection for a predetermined period of time.

According to one embodiment of the present invention, the digital twin generation unit 1500 and the digital twin comparison unit 1400 illustrated in FIG. 14 are physically located in the same space together with the metaverse base information derivation unit 3100, the metaverse implementation unit 3200, and the metaverse comparison unit 3300. However, according to another embodiment of the present invention, the digital twin generation unit 1500 and the digital twin comparison unit 1400 may be located at spaces that are physically separated from the metaverse base information derivation unit 3100, the metaverse implementation unit 3200, and the metaverse comparison unit 3300, and may transmit and receive information to and from each other through wired or wireless communication.

In addition, the metaverse generation unit performs the same operation as the digital twin generation unit 1500 performing the digital twin generation step S500, and includes the metaverse base information derivation unit 3100 and the metaverse implementation unit 3200. The metaverse comparison unit 3300 includes a composite congestion index derivation unit 1600 and an evaluation index display unit 1700, in which the composite congestion index derivation unit 1600 and the evaluation index display unit 1700 receive traffic information implemented in an actual metaverse and one or more virtual metaverses in addition to the actual digital twin 311 and the one or more virtual digital twins 312, and perform the composite congestion index derivation step S600 and an evaluation index display step S700. That is, the following description is about a process of performing the method and system for calculating and comparing evaluation indices using the digital twin 300, but the method and system for calculating and comparing evaluation indices using the metaverse are also the same.

Additionally, the system for calculating and comparing evaluation from the composite congestion index derivation unit 1600 may further perform an evaluation index calculation step of calculating an evaluation index as a total of a composite congestion index calculate from all lanes of the corresponding intersection, and may also perform and a comparison interface display step of transmitting, to the user terminal 2000, a comparison interface including one existing image layer 410 for outputting a graphical output value from the actual digital twin 311 and one or more comparison image layer 420 for outputting graphical output values from one or more virtual digital twins 312. The system may further include an evaluation index display unit 1700 performing the evaluation index display step S700 of displaying, on a detailed information layer 430, an evaluation index corresponding to a traffic situation implemented as each digital twin 300 in the comparison interface. The detailed information layer 430 is included in each of the existing image layer 410 and the one or more comparative image layers 420, and the user selects one of the respective digital twins 300 based on the evaluation index corresponding to the traffic situation implemented as the respective digital twins 300, thereby reflecting the signal system of the digital twin 300 selected by the user in the signal system of the corresponding intersection. The more detailed description of the evaluation index calculation step and the comparison interface display step will be provided in the description of FIG. 17.

It may take a lot of time for the user to simultaneously compare the composite congestion indices of each lane calculated in the actual digital twin 311 to which the actual signal system information is applied and the virtual digital twin 312 to which the one or more virtual signal system information are applied, and the user may not recognize the composite congestion indices that are changed in response to the traffic situation that changes in real time. Therefore, as the evaluation index calculated by summing the composite congestion indices of each lane is used, the user may easily recognize the degree of traffic jam occurring at the intersection by facing each detailed information layer 430.

Specifically, a value of the evaluation index is set to a time increased due to congestion of traveling when a lane stops or decelerates due to a signal control as compared to when the lane group does not decelerate. When the evaluation index is small, it means that the increased travel time of all vehicles is short due to the signal control of the intersection. In other words, the traffic situation being implemented in the corresponding digital twin 300 means light traffic jam. On the contrary, when the evaluation index is large, it means that the increased travel time of all vehicles is long due to the signal control of the intersection. That is, the traffic situation being implemented in the corresponding digital twin 300 means heavy traffic jam. Through this method, the user may compare the evaluation index of the actual digital twin 311 with the evaluation indices of one or more virtual digital twin 312 to find the lowest evaluation index, and may derive virtual signal system information being input to the digital twin 300 corresponding to the evaluation index, that is, an optimal signal system capable of minimizing traffic jam at the corresponding intersection. As a result, it is possible to solve the traffic jam occurring in real time by applying the optimal traffic signal system to the traffic signal system of the actual intersection.

FIGS. 15A, 15B, 15C, and 15D schematically illustrate the number of cases used in a process of calculating a composite congestion index according to one embodiment of the present invention.

Figure 15A:
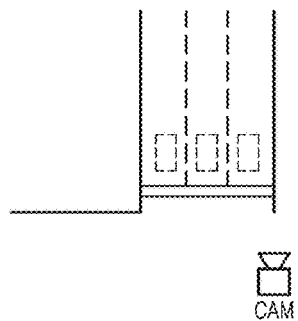
FIGS. 15A, 15B, 15C, and 15D schematically illustrate the number of cases used in a process of calculating a composite congestion index according to one embodiment of the present invention.

Schematically, FIG. 15A illustrates a case in which the number of vehicles in an initial waiting queue does not exist before an analysis period.

The initial waiting queue means vehicles that remain on the lane before the analysis period is started. The initial waiting queue is an important index causing an additional congestion to a vehicle arriving at the analysis period, and the method for calculating a composite congestion index may vary depending on the initial waiting queue.

Figure 15B:
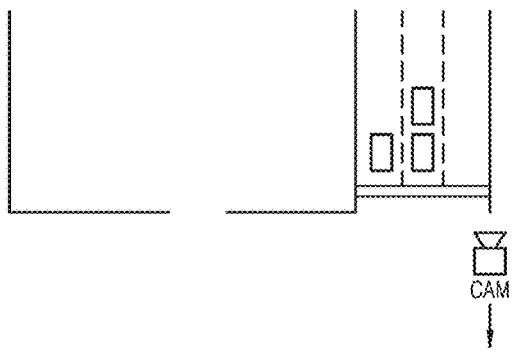
Figure 15B:
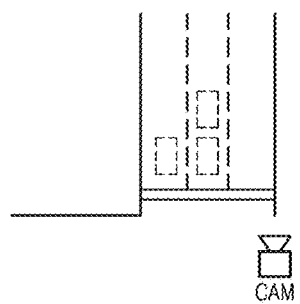

FIG. 15B illustrates a case in which the number of vehicles in the initial waiting queue exists, whereas all traffic volumes arriving within the analysis period pass through the intersection, and waiting vehicles do not exist after the analysis period. Specifically, this means that an accommodation degree of the traffic volume of the vehicles that may pass through the intersection during an effective driving time in the analysis period is greater than the number of vehicles in the initial waiting queue, so that all vehicles may pass through the intersection during the analysis period such that the waiting vehicles do not exist after the analysis period.

The effective driving time is a time when a flow of a certain vehicle is in progress, and is derived by subtracting a red signal time and a start delay time from a signal system cycle and adding a driving extension time thereto. The start delay time is a time in which a vehicle close to a stop line is additionally delayed when a green signal is turned on in the corresponding lane group when the vehicle escapes from the stop line, and the driving extension time is a time in which a portion of a yellow signal is inevitably used like the green signal because the vehicle driving in or near the intersection may not suddenly stop at the stop line when the yellow signal is turned on in the corresponding lane group.

The lane group refers to vehicles that move together in response to the same signal, and may include vehicles traveling in one or more lanes. For example, when an intersection is divided into only a right-turn lane, a straight-forward lane, and a left-turn lane as illustrated in FIG. 4C, which mean vehicles moving together in response to a corresponding signal in one lane.

Figure 15C:
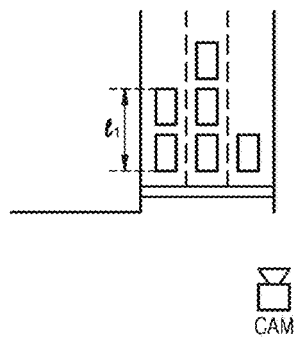
Figure 15C:
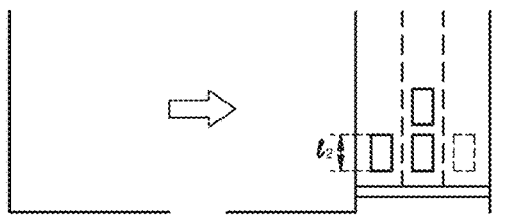

FIG. 15C illustrates a case in which the number of vehicles in the initial waiting queue exists and the waiting vehicles still remain after the analysis period, whereas a length of the waiting queue is reduced as compared with the initial waiting queue. Specifically, this means that the accommodation degree of the traffic volume of vehicles that may pass through the lane during the effective driving time in the analysis period is less than the number of vehicles of the initial waiting queue, so that the length of the waiting vehicles still remain after the analysis period, whereas the accommodation degree is greater than 0, so that the length of the waiting queue is reduced.

Figure 15D:
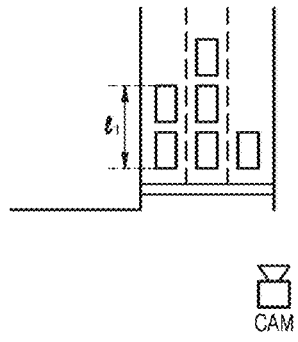
Figure 15D:
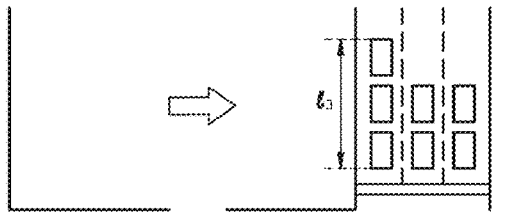

FIG. 15D illustrates a case in which the number of vehicles in the initial waiting queue exists, the waiting vehicles still remain after the analysis period, and the length of the waiting queue is increased as compared with the initial waiting queue. Specifically, this means that the accommodation degree of the traffic volume of vehicles that may pass through the lane during the effective driving time in the analysis period is less than the number of vehicles of the initial waiting queue, so that the length of the waiting vehicles still remain after the analysis period, and the accommodation degree is less than 0, so that the length of the waiting queue is increased in an overfull state of the lane.

Figure 16:
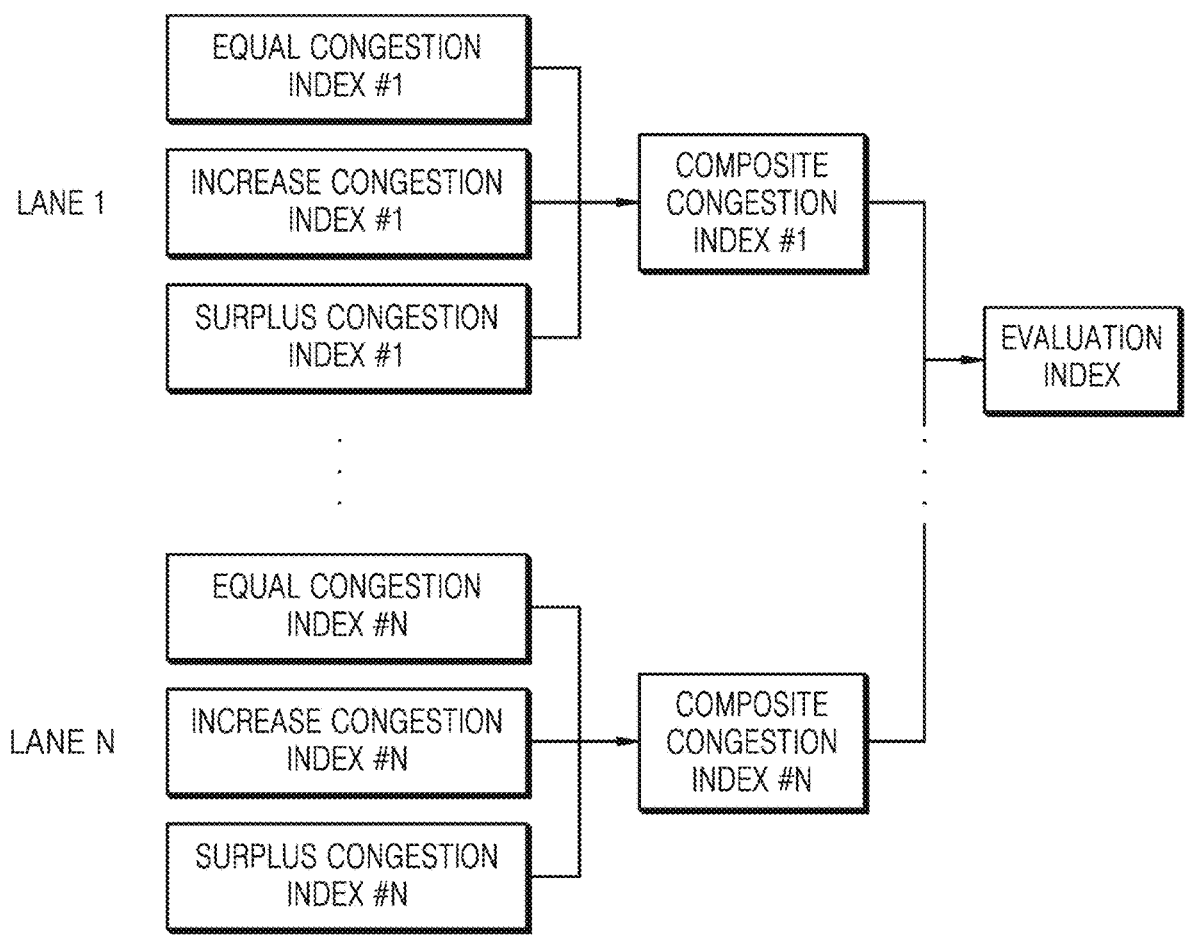
FIG. 16 schematically illustrates constituent elements of an evaluation index for performing the method for calculating evaluation indices according to one embodiment of the present invention.

FIG. 16 schematically illustrates constituent elements of an evaluation index for performing the method for calculating evaluation indices according to one embodiment of the present invention.

As illustrated in FIG. 16, the composite congestion index is derived based on an equal congestion index, in which the equal congestion index is a travel time of the vehicles increased due to a signal control when the vehicles have arrived during a preset analysis period at regular intervals in the intersection. In addition, the composite congestion index is derived based on an increase congestion index, in which the increase congestion index is a travel time increased when the vehicles have arrived at irregular intervals and the traffic volumes of vehicles arriving during one signal cycle do not escape from the stop line during a closest green time. Additionally, the composite congestion index is derived based on a surplus congestion index, in which the surplus congestion index is an additional time required for the vehicles, which have arrived during the analysis period as the waiting vehicles escape from the initial waiting queue when the initial waiting queue remains.

In addition, as illustrated in FIG. 16, the composite congestion index is calculated based on a sum of two or more equal congestion indices, increase congestion indices, and surplus congestion indices.

Preferably, the composite congestion index is calculated based on a sum of a value obtained by multiplying the equal congestion index, the increase congestion index, and the surplus congestion index by a weight. More preferably, the composite congestion index may be derived based on the following [Equations 1 to 8]. Meanwhile, according to another embodiment of the present invention, the composite congestion index is not limited to the following [Equations 1 to 8] used in a process of calculating the composite congestion index, and may be derived based on a value obtained by multiplying an arbitrary weight according to a user's need.

Next, provided is the definition of parameters used in the following description for the equal congestion index, the increase congestion index, and the surplus congestion index, which are the basis of the composite congestion index.

$Q_b$=number (unit) of vehicles in initial waiting queue, $d_1$=equal congestion index (see/unit), $d_2$=increase congestion index (see/unit), $d_3$=surplus congestion index (see/unit), C=signal system cycle (sec), g=effective driving time allocated to corresponding lane group (sec), X=accommodation degree of corresponding lane group, R=red signal time (sec), y=relative traffic volume, T=analysis period length (hour), S=effective traffic flow rate, c=volume of corresponding lane group, A=arrival traffic volume of corresponding lane group during analysis period <First Case of Equal Congestion Index $d_1$—when Initial Waiting Queue does not Exist on Lane>

The equal congestion index $d_1$ is derived based on the signal system cycle C, the effective driving time g allocated to the corresponding lane group, and the accommodation degree X of the corresponding lane group. Preferably, the equal congestion index $d_1$ is derived based on a value obtained by dividing a minimum value between 1 and the accommodation degree X and the effective driving time g by the signal system cycle C. More preferably, equal congestion index $d_1$ is derived based on a square value of a value obtained by subtracting the value, which is obtained by dividing the effective driving time g by the signal system cycle C, from 1. This may be expressed as an equation as shown in [Equation 1].

$$d_1 = \frac{0.5C\left(1 - \frac{g}{C}\right)^2}{1 - \left[\min(1, X)\frac{g}{C}\right]} \quad \text{[Equation 1]}$$

The accommodation degree X is a ratio of an actual traffic volume during a preset time to the volume c of the corresponding lane group during the preset time. The volume c is a maximum traffic volume that vehicles may pass through the intersection in the corresponding lane during the preset time, and is derived by a product of the effective traffic flow rate S and the effective driving time g for the signal system cycle C. The actual traffic volume is derived by converting the largest traffic volume among the traffic volumes measured by a plurality of times for a time shorter than the preset time by the preset time. The effective traffic flow rate S is a maximum traffic volume under the assumption that the vehicles use 100% of the effective driving time without a delay time when the green signal continues during the preset time.

In [Equation 1], min(1, X) is selection of a minimum value between 1 and X. When the accommodation degree X exceeds 1, it means that the corresponding lane group is overfull because the traffic volume of the corresponding lane group is larger than the volume c, and thus 1 is selected.

When the accommodation degree X is less than 1 so that a value of min(1, X) is the accommodation degree X, the accommodation degree X is a ratio of the current traffic volume to the volume c of the lane group, and thus the denominator of the equation may be considered to be equal to 1—relative traffic volume y. The relative traffic volume y is a ratio of the actual traffic volume during the preset time to the effective traffic flow rate S during the preset time.

<Second Case of Equal Congestion Index $d_1$—when Initial Waiting Queue Exists on Lane, Whereas all Traffic Volumes of Vehicles Arriving within Analysis Period Pass Through Intersection, and Waiting Queue does not Exist on Corresponding Lane after Analysis Period>

The equal congestion index $d_1$ is derived based on the red signal time R, the signal system cycle C, the number of vehicles $Q_b$ in the initial waiting queue, the analysis period length T, the effective traffic flow rate S, and the relative traffic volume y. Preferably, the equal congestion index $d_1$ is derived based on a product of the number of vehicles $Q_b$ in the initial waiting queue and the red signal time R, and a product of the analysis period length T and the effective traffic flow rate S. More preferably, the equal congestion index $d_1$ is derived based on a value obtained by dividing the product of the number of vehicles $Q_b$ in the initial waiting queue and the red signal time R by the product of the analysis period length T and the effective traffic flow rate S. This may be expressed as an equation as shown in [Equation 2].

$$d_1 = \frac{R^2}{2C(1-y)} + \frac{Q_b R}{2TS(1-y)} \quad \text{[Equation 2]}$$

Referring to [Equation 2], it can be seen that as the red signal time R increases or the number of vehicles $Q_b$ in the initial waiting queue increases, the equal congestion indicator $d_1$ increases, and as a result, the travel time of congestion of the vehicles increases, and thus the composite congestion index may increase.

<Third Case of Equal Congestion Index $d_1$—when Initial Waiting Queue Exists on Lane, and Waiting Vehicles Still Remain on Corresponding Lane after Analysis Period>

The equal congestion index $d_1$ is derived based on the red signal time R. Preferably, the red signal time R is derived based on a value obtained by dividing the red signal time R by 2. This may be expressed as an equation as shown in [Equation 3].

$$d_1 = \frac{R}{2} \qquad \text{[Equation 3]}$$

Referring to [Equation 3], it can be seen that as the red signal time R increases, the equal congestion index $d_1$ increases, and as a result, the travel time of congestion of the vehicles increases, and thus the composite congestion index may increase.

<Case of Increase Congestion Index $d_2$—Number of Cases Calculated Differently from Equal Congestion Index $d_1$ and Surplus Congestion Index $d_3$ is not Divided>

The increase congestion index $d_2$ is derived based on the analysis period length T, the accommodation degree X of the corresponding lane group, and the volume c of the corresponding lane group. Preferably, the increase congestion index $d_2$ is derived based on a value obtained by subtracting 1 from the accommodation degree X and a value obtained by multiplying the volume c by the analysis period length T. More preferably, the increase congestion index $d_2$ is derived based on a square value of the value obtained by subtracting 1 from the accommodation degree X, and a value obtained by dividing the accommodation degree X by the value obtained by multiplying the volume c by the analysis period length T. This may be expressed as an equation as shown in [Equation 4].

$$d_2 = 900T\left[(X-1) + \sqrt{(X-1)^2 + \frac{4X}{cT}}\right] \qquad \text{[Equation 4]}$$

Referring to [Equation 4], it can be seen that as the accommodation degree X of the lane group increases or the volume c of the lane group decreases, the increase congestion index $d_2$ increases, and as a result, the travel time of congestion of the vehicles increases, and thus the composite congestion index may increase.

<First Case of Surplus Congestion Index $d_3$—when Initial Waiting Queue Exists on Lane, Whereas all Traffic Volumes of Vehicles Arriving within Analysis Period Pass Through Intersection, and Waiting Queue does not Exist on Corresponding Lane after Analysis Period>

The surplus congestion index $d_3$ is derived based on the number of vehicles $Q_b$ in the initial waiting queue, the volume c of the corresponding lane group, the analysis period length T, and the arrival traffic volume A of the corresponding lane group. Preferably, the surplus congestion index $d_3$ is derived based on a square of the number of vehicles $Q_b$ in the initial waiting queue and a value obtained by subtracting the arrival traffic volume A from the volume c. More preferably, the surplus congestion index $d_3$ is derived based on a value obtained by dividing the square of the number of vehicles $Q_b$ in the initial waiting queue by the value obtained by subtracting the arrival traffic volume A from the volume c. This may be expressed as an equation as shown in [Equation 5].

$$d_3 = \frac{1800 Q_b^2}{cT(c-A)} \qquad \text{[Equation 5]}$$

Referring to [Equation 5], it can be seen that as number of vehicles $Q_b$ in the initial waiting queue increases or the volume c of the lane group decreases, the surplus congestion index $d_3$ increases, and as a result, the travel time of congestion of the vehicles increases, and thus the composite congestion index may increase.

<Second Case of Surplus Congestion Index $d_3$—when Initial Waiting Queue Exists on Lane and Waiting Vehicles Still Remain after Analysis Period, Whereas Length of Waiting Queue is Reduced as Compared with Initial Waiting Queue>

The surplus congestion index $d_3$ is derived based on the number of vehicles $Q_b$ in the initial waiting queue, the volume c of the corresponding lane group, the analysis period length T, and the accommodation degree X of the corresponding lane group. Preferably, the surplus congestion index $d_3$ is derived based on a value obtained by dividing the number of vehicles $Q_b$ in the initial waiting queue by the volume c of the lane group, and a value obtained by subtracting the accommodation degree X from 1. This may be expressed as an equation as shown in [Equation 6].

$$d_3 = \frac{3600 Q_b}{c} - 1800T(1-X) \qquad \text{[Equation 6]}$$

Referring to [Equation 6], it can be seen that as number of vehicles $Q_b$ in the initial waiting queue increases or the volume c of the lane group decreases, the surplus congestion index $d_3$ increases, and as a result, the travel time of congestion of the vehicles increases, and thus the composite congestion index may increase.

<Third Case of Surplus Congestion Index $d_3$—when Initial Waiting Queue Exists on Lane, Waiting Vehicles Still Remain after Analysis Period, and Length of Waiting Queue is Increased>

The surplus congestion index $d_3$ is derived based on the number of vehicles $Q_b$ in the initial waiting queue and the volume c of the corresponding lane group. Preferably, the surplus congestion index $d_3$ is derived based on a value obtained by dividing the number of vehicles $Q_b$ in the initial waiting queue by the volume c of the lane group. This may be expressed as an equation as shown in [Equation 7].

$$d_3 = \frac{3600 Q_b}{c} \qquad \text{[Equation 7]}$$

Referring to [Equation 7], it can be seen that as the number of vehicles $Q_b$ in the initial waiting queue increases or the volume c of the lane group decreases, the surplus congestion index $d_3$ increases, and as a result, the travel time of congestion of the vehicles increases, and thus the composite congestion index may increase.

Factors affecting the composite composite index may include a signal efficiency coefficient PF in addition to the equal congestion index $d_1$, the increase congestion index $d_2$, and the surplus congestion index $d_3$. The signal efficiency coefficient PF is a coefficient indicating a degree to which the signal system affects the flow of vehicles on the lane. Specifically, as the signal interlocking fits the vehicle flow well, the signal efficiency coefficient PF is lowered. That is, even if the number of vehicles flowing into the lane increases by the volume c of the corresponding lane, when the green signal is well interlocked in response thereto, the delayed travel time of the vehicles above the lane does not significantly increase. On the contrary, even if the number of vehicles far below the volume c flows into the lane, when the green signal is not displayed for a long time, the delayed travel time of the vehicles increases. In particular, since the signal efficiency coefficient PF acts the greatest factor on the above-described equal congestion index $d_1$, the signal efficiency coefficient PF is applied only to the equal congestion index $d_1$, and as a result, the composite congestion index may be calculated by a product of the equal congestion index $d_1$ and the signal efficiency coefficient PF, and a sum of the increase congestion index $d_2$ and the surplus congestion index $d_3$.

$$d = d_1(PF) + d_2 + d_3 \qquad \text{[Equation 8]}$$

As described above, the composite congestion index is calculated by the parameters of the equation above, as the number of vehicles $Q_b$ in the initial waiting queue increases or the red signal time increases, the value of the equal congestion index $d_1$ increases, as the accommodation degree X of the lane, that is, the traffic volume increases, the value of the increase congestion index $d_2$ increases, and as the number of vehicles $Q_b$ in the initial waiting queue decreases or the volume c of the lane increases, the value of the surplus congestion index $d_3$ decreases. Specifically, the value of the composite congestion index may be adjusted using the variables of the above equation or the signal efficiency coefficient. The technical feature of the present invention is to digitalize the degree of traffic jam occurring by facing the digital twin 300 implemented in real time through the parameters, and to change the parameters in order to respond to the traffic jam. The one or more virtual digital twins 312 are created by changing the parameters, and when one or more evaluation indices of the implemented digital twins 300 are calculated and displayed on the detailed information layer 430, the user may easily find a virtual signal system more efficient than an actual signal system. As a result, it is possible to quickly and flexibly alleviate the traffic jam occurring at the corresponding intersection by applying the most effective virtual signal system found by the user to the actual intersection in real time.

As one embodiment of the present invention, a method for changing the signal system is used because it is impossible to substantially change the traffic object information of the vehicles at the actual intersection.

First, for example, in the second and third cases of the equal congestion index $d_1$, the value of the equal congestion index $d_1$ may be decreased by simply decreasing the red signal time R. When the user determines that the traffic jam of the relevant lane is severe, the red signal time R of the lane may be reduced, thereby alleviating the traffic jam at the corresponding intersection.

Further, the signal efficiency coefficient PR is lowered to decrease the evaluation index. A method for outputting a green signal of one or more of the preset first cycle to the corresponding lane when the user determines that the traffic jam of the corresponding lane is severe by manipulating the display order of a specific signal is used. In addition, a method for outputting a green signal first to the corresponding lane by changing the order of a red signal with a scheduled pre-output and a green signal with a scheduled post-output is used. As a result, as in the above examples, it is possible to alleviate the traffic jam by lowering the signal efficiency coefficient PF such that the traffic flow is not cut off by interlocking the signal according to the flow of the vehicle.

Figure 17:
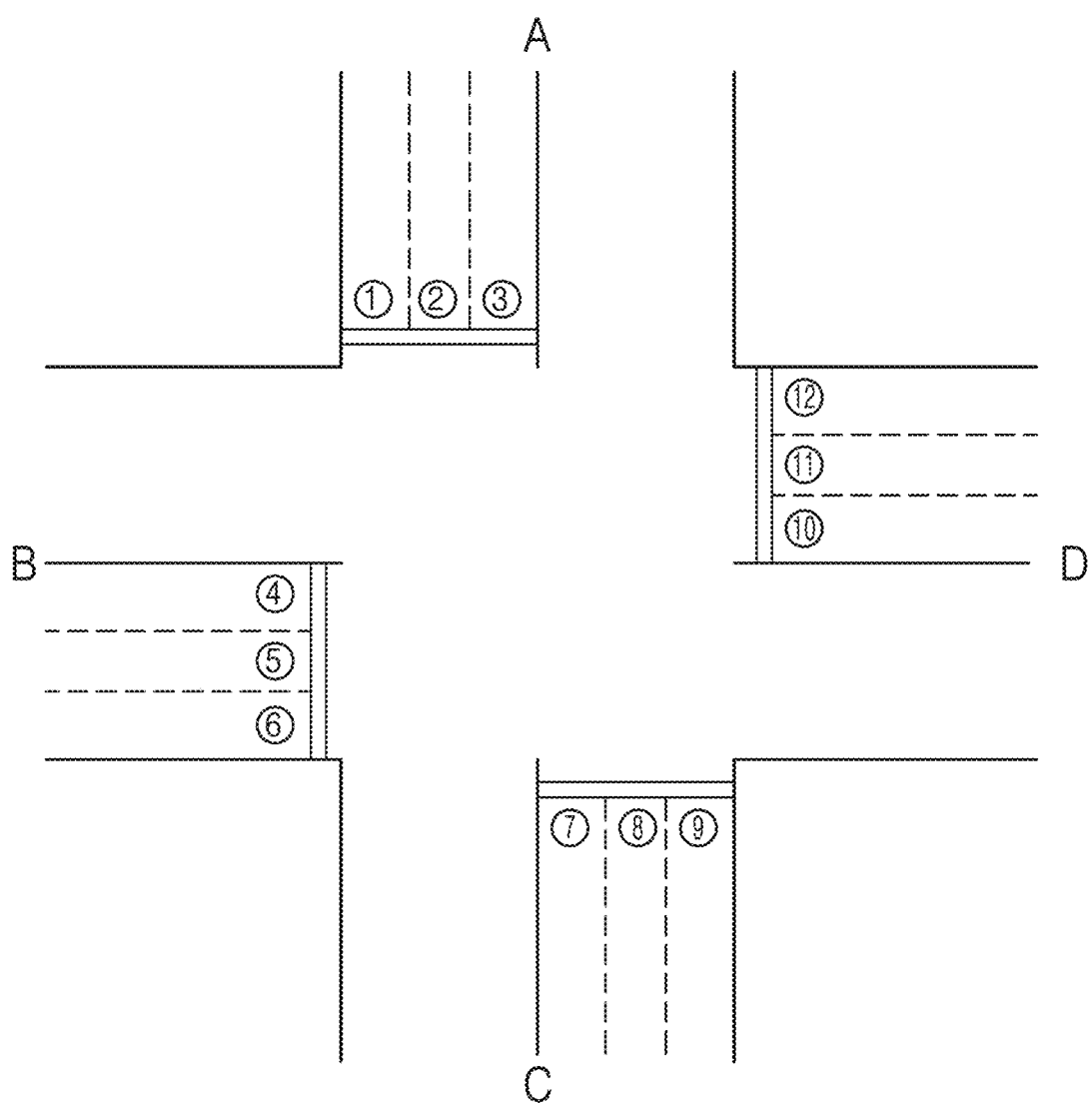
FIG. 17 schematically illustrates a process of deriving composite congestion indices based on the evaluation indices according to one embodiment of the present invention.

FIG. 17 schematically illustrates a process of deriving a composite congestion index based on the evaluation indices according to one embodiment of the present invention.

As illustrated in FIG. 17, the method for calculating and comparing evaluation indices for a signal system of an intersection further includes: an evaluation index calculation step of calculating an evaluation index as a total of composite congestion indices calculated from all lanes of the corresponding intersection; a comparison interface display step of transmitting, to a user terminal 2000, a comparison interface including one existing image layer 410 for outputting a graphical output value from the actual digital twin 311 and one or more comparison image layers 420 for outputting graphical output values from one or more virtual digital twins 312; and an evaluation index display step S700 of displaying, on a detailed information layer 430, an evaluation index corresponding to a traffic situation implemented as each digital twin 300 in the comparison interface, in which the detailed information layer 430 is included in each of the existing image layer 410 and the one or more comparison image layers 420, and the user selects one of digital twins 300 based on the evaluation index corresponding to the traffic situation implemented as each digital twin 300 so that a signal system of the digital twin 300 selected by the user is reflected in the signal system of the corresponding intersection.

Specifically, the composite congestion index derivation unit 1600 included in the digital twin comparison unit 1400 performs the composite congestion index derivation step S600, the evaluation index calculation step, and the comparison interface step. Through the evaluation index calculation step, an evaluation value, which is a value obtained by summing all composite congestion indices calculated from all lanes at the corresponding intersection, is calculated. In addition, as illustrated in FIG. 8, through the comparison interface step, the comparison interface including one existing image layer 410 and one or more comparison image layers 420 is transmitted to the user terminal 2000 such that the user may see the comparison interface. In addition, the previously calculated evaluation index is recorded in the detailed information layer 430 included in the existing image layer 410 and the one or more comparison image layers 420 through the evaluation index display step S700.

As a result, the user may observe one or more traffic situations at a glance through the comparison interface in the user terminal 2000, and may easily determine and analyze the traffic conditions through the evaluation index corresponding to each digital twin 300. In addition, the user may apply the signal system that calculates the lowest evaluation index to the actual corresponding intersection in real time.

Meanwhile, as illustrated in FIG. 17, 12 lanes are included in one cross (+)-shaped intersection, but the number of lanes may further increase according to the type of intersection. As described above, since the user is not efficient to recognize the composite congestion indices of the several lanes from the existing image layer 410 and the one or more comparison image layers 420 while observing the comparison interface, the evaluation index is calculated to solve the problem, and is calculated based on the total of the composite congestion indices corresponding to the respective lanes of the intersection.

FIG. 17 is one embodiment of the present invention, in which one road includes three lanes, four roads in total is present, and the entire intersection includes 12 lanes. In brief, since the composite congestion index is a travel time of vehicles that is lengthened due to a signal control in one lane, the evaluation index obtained by summing all the composite congestion indices of one or more lanes at the intersection becomes a value calculated for all vehicles within the intersection.

Meanwhile, according to another embodiment of the present invention, in order for the user to easily recognize an average congestion time of the vehicles at the intersection, the evaluation index may be written in the detailed information layer 430 by dividing the evaluation index by the number of vehicles to derive an average evaluation index value. For example, when the evaluation index of the intersection including 12 lanes is 36, the average evaluation index 3 is written in the detailed information layer 430, thereby allowing the user to easily recognize the average congestion travel time of the vehicles at the corresponding intersection. In addition, the value of the evaluation index may be divided step by step through a preset rule. For example, when the user sets the evaluation index value of 1 to 10 as a first level, and the evaluation index value of 11 to 20 as a second level, the corresponding evaluation index level is written in the detailed information layer 430, so that the user may easily recognize the degree of traffic jam at the corresponding intersection.

Figure 18:
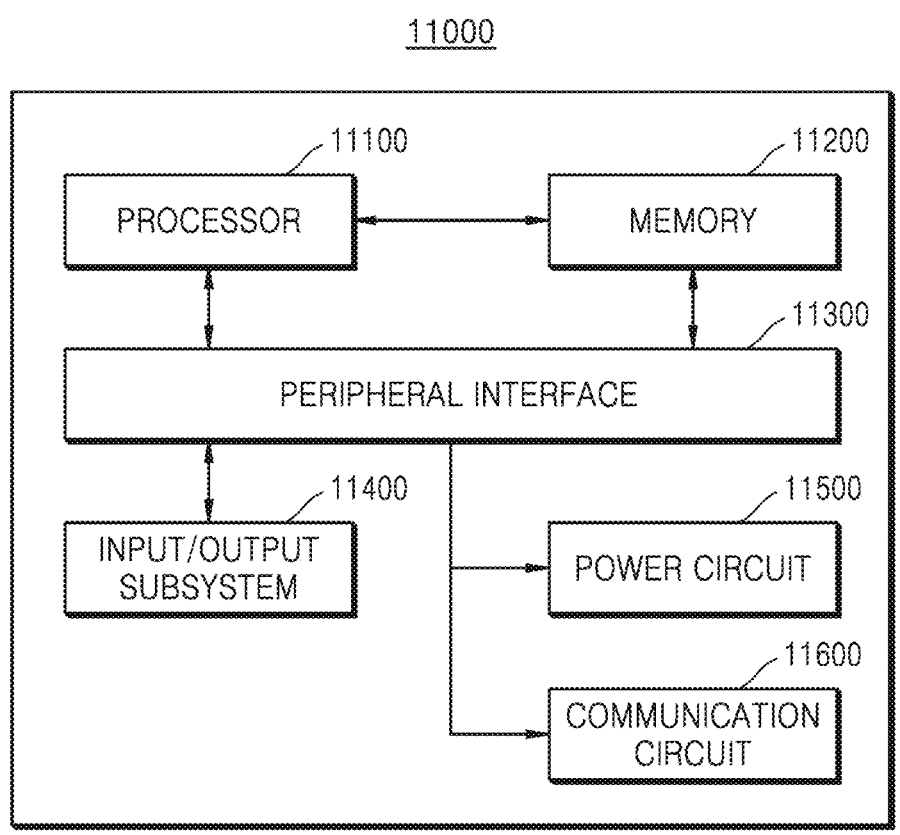
FIG. 18 schematically illustrates an internal configuration of the computing device according to one embodiment of the present invention.

FIG. 18 schematically shows internal components of the computing device according to one embodiment of the present invention.

The lighting device control apparatus 1000, the user terminal 3000, and the lighting device server 5000 shown in the above-described FIG. 1 may include components of the computing device 11000 shown in FIG. 18.

As shown in FIG. 18, the computing device 11000 may at least include at least one processor 11100, a memory 11200, a peripheral device interface 11300, an input/output subsystem (I/O subsystem) 11400, a power circuit 11500, and a communication circuit 11600. The computing device 11000 may correspond to the computing device 1000 shown in FIG. 1.

The memory 11200 may include, for example, a high-speed random access memory, a magnetic disk, an SRAM, a DRAM, a ROM, a flash memory, or a non-volatile memory. The memory 11200 may include a software module, an instruction set, or other various data necessary for the operation of the computing device 11000.

The access to the memory 11200 from other components of the processor 11100 or the peripheral interface 11300, may be controlled by the processor 11100.

The peripheral interface 11300 may combine an input and/or output peripheral device of the computing device 11000 to the processor 11100 and the memory 11200. The processor 11100 may execute the software module or the instruction set stored in memory 11200, thereby performing various functions for the computing device 11000 and processing data.

The input/output subsystem may combine various input/output peripheral devices to the peripheral interface 11300. For example, the input/output subsystem may include a controller for combining the peripheral device such as monitor, keyboard, mouse, printer, or a touch screen or sensor, if needed, to the peripheral interface 11300. According to another aspect, the input/output peripheral devices may be combined to the peripheral interface 11300 without passing through the I/O subsystem.

The power circuit 11500 may provide power to all or a portion of the components of the terminal. For example, the power circuit 11500 may include a power failure detection circuit, a power converter or inverter, a power status indicator, a power failure detection circuit, a power converter or inverter, a power status indicator, or any other components for generating, managing, and distributing the power.

The communication circuit 11600 may use at least one external port, thereby enabling communication with other computing devices.

Alternatively, as described above, if necessary, the communication circuit 11600 may transmit and receive an RF signal, also known as an electromagnetic signal, including RF circuitry, thereby enabling communication with other computing devices.

The above embodiment of FIG. 18 is merely an example of the computing device 11000, and the computing device 11000 may have a configuration or arrangement in which some components shown in FIG. 18 are omitted, additional components not shown in FIG. 18 are further provided, or at least two components are combined. For example, a computing device for a communication terminal in a mobile environment may further include a touch screen, a sensor or the like in addition to the components shown in FIG. 18, and the communication circuit 11600 may include a circuit for RF communication of various communication schemes (such as WiFi, 3G, LTE, Bluetooth, NFC, and Zigbee). The components that may be included in the computing device 11000 may be implemented by hardware, software, or a combination of both hardware and software which include at least one integrated circuit specialized in a signal processing or an application.

The methods according to the embodiments of the present invention may be implemented in the form of program instructions to be executed through various computing devices, thereby being recorded in a computer-readable medium. In particular, a program according to an embodiment of the present invention may be configured as a PC-based program or an application dedicated to a mobile terminal. The application to which the present invention is applied may be installed in the computing device 11000 through a file provided by a file distribution system. For example, a file distribution system may include a file transmission unit (not shown) that transmits the file according to the request of the computing device 11000.

The above-mentioned device may be implemented by hardware components, software components, and/or a combination of hardware components and software components. For example, the devices and components described in the embodiments may be implemented by using at least one general purpose computer or special purpose computer, such as a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and at least one software application executed on the operating system. In addition, the processing device may access, store, manipulate, process, and create data in response to the execution of the software. For the further understanding, some cases may have described that one processing device is used, however, it is well known by those skilled in the art that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, a code, and an instruction, or a combination of at least one thereof, and may configure the processing device to operate as desired, or may instruct the processing device independently or collectively. In order to be interpreted by the processor or to provide instructions or data to the processor, the software and/or data may be permanently or temporarily embodied in any type of machine, component, physical device, virtual equipment, computer storage medium or device, or in a signal wave to be transmitted. The software may be distributed over computing devices connected to networks, so as to be stored or executed in a distributed manner. The software and data may be stored in at least one computer-readable recording medium.

The method according to the embodiment may be implemented in the form of program instructions to be executed through various computing mechanisms, thereby being recorded in a computer-readable medium. The computer-readable medium may include program instructions, data files, data structures, and the like, independently or in combination thereof. The program instructions recorded on the medium may be specially designed and configured for the embodiment, or may be known to those skilled in the art of computer software so as to be used. An example of the computer-readable medium includes a magnetic medium such as a hard disk, a floppy disk and a magnetic tape, an optical medium such as a CD-ROM and a DVD, a magneto-optical medium such as a floptical disk, and a hardware device specially configured to store and execute a program instruction such as ROM, RAM, and flash memory. An example of the program instruction includes a high-level language code to be executed by a computer using an interpreter or the like as well as a machine code generated by a compiler. The above hardware device may be configured to operate as at least one software module to perform the operations of the embodiments, and vise versa.

According to one embodiment of the present invention, anyone can safely and conveniently reset an AP setting of a lighting device control apparatus as compared with the related art in which there is a difficulty in resetting a lighting device control apparatus because the lighting device control apparatus is generally installed on a ceiling.

Although the above embodiments have been described with reference to the limited embodiments and drawings, however, it will be understood by those skilled in the art that various changes and modifications may be made from the above-mentioned description. For example, even though the described descriptions may be performed in an order different from the described manner, and/or the described components such as system, structure, device, and circuit may be coupled or combined in a form different from the described manner, or replaced or substituted by other components or equivalents, appropriate results may be achieved.

Therefore, other implementations, other embodiments, and equivalents to the claims are also within the scope of the following claims.

What is claimed is:

1. A method for calculating and comparing evaluation indices for a signal system of an intersection, which is performed in a computing system including one or more memories and one or more processors, the method comprising:

a traffic statistical information generation step of receiving image information in real time through cameras installed at points facing each road of the intersection to derive traffic object information including traffic volume for each driving direction and traffic volume for each lane on a corresponding road at a preset first cycle, and to generate traffic statistical information including the traffic object information and intersection environment information including signal system information of a corresponding intersection;

a digital twin generation step of inputting the traffic statistical information, which is generated in a unit of the preset first cycle, to a simulator, and implementing a traffic situation of the intersection as a graphical digital twin based on an output value of the simulator; and a composite congestion index derivation step of deriving a composite congestion index from each of an actual digital twin, to which actual signal system information is applied, and a virtual digital twin, to which virtual signal system information input by one or more users is applied, in which the evaluation indices are derived based on a congestion time of a predetermined number of vehicles at the corresponding intersection for a predetermined period of time.

2. The method of claim 1, wherein the composite congestion index is derived based on an equal congestion index, and the equal congestion index is a travel time of the vehicles increased due to a signal control when the vehicles have arrived at a stop line of the lane or a rear of a waiting queue at regular intervals in the intersection.

3. The method of claim 2, wherein the equal congestion index is calculated based on a signal system cycle, an effective driving time allocated to a corresponding lane group, and an accommodation degree of the corresponding lane group, when an initial waiting queue does not exist on the lane.

4. The method of claim 2, wherein the equal congestion index is calculated based on a red signal time, a signal system cycle, a number of vehicles in an initial waiting queue, a length of an analysis period, an effective traffic flow rate, and a relative traffic volume, when an initial waiting line exists on the lane, whereas all traffic volumes of the vehicles arriving within the analysis period passes through the intersection, and the waiting queue does not exist on the lane after the analysis period.

5. The method of claim 2, wherein the equal congestion index is calculated based on a red signal time when an initial waiting queue exists on the lane and waiting vehicles still remain on the corresponding lane after the analysis period.

6. The method of claim 1, wherein the composite congestion index is derived based on an increase congestion index, and the increase congestion index is a travel time which increases when the vehicles have arrived at a stop line of the lane or a rear of a waiting queue at irregular intervals and when the vehicles, which have arrived at the stop line of the lane or the rear of the waiting queue for one signal cycle, do not escape from the stop line during a closest green time.

7. The method of claim 6, wherein the increase congestion index is calculated based on a length of an analysis period, an accommodation degree of the corresponding lane group, and a volume of the corresponding lane group.

8. The method of claim 1, wherein the composite congestion index is derived based on a surplus congestion index, and the surplus congestion index is an additional time required for vehicles, which have arrived at a stop line of the lane or a rear of a waiting queue during the analysis period as an initial waiting queue of the vehicles passes through the lane, when the initial waiting queue remains on the lane before the analysis period is started.

9. The method of claim 8, wherein the surplus congestion index is calculated based on a number of vehicles in the initial waiting queue, a volume of a corresponding lane group, a length of the analysis period, and an arrival traffic volume of the corresponding lane group, when the initial waiting queue exists on the lane, whereas all traffic volumes of the vehicles arriving within the analysis period pass through the intersection, and a waiting queue does not exist on the corresponding lane after the analysis period.

10. The method of claim 8, wherein the surplus congestion index is calculated based on a number of vehicles in the initial waiting queue, a volume of the corresponding lane group, a length of the analysis period, and an accommodation degree of the corresponding lane group, when the initial waiting queue exists on the lane and the waiting vehicles still remain after the analysis period, whereas a length of a queue of the waiting vehicles is shorter than the initial waiting queue.

11. The method of claim 8, wherein the surplus congestion index is calculated based on a number of vehicles in the initial waiting queue and a volume of the corresponding lane, when the initial waiting queue exists on the lane, and the waiting vehicles still remain after the analysis period, whereas a length of a queen of the waiting vehicles is longer than the initial waiting queue.

12. The method of claim 1, wherein the composite congestion index is calculated based on a sum of two or more of the equal congestion indices, increase congestion indices, and surplus congestion indices, the equal congestion index is a travel time of the vehicles increased due to a signal control when the vehicles have arrived at a stop line of the lane or a rear of a waiting queue at regular intervals in the intersection, the increase congestion index is a travel time which increases when the vehicles have arrived at the stop line of the lane or the rear of the waiting queue at irregular intervals and when the vehicles, which have arrived at the stop line of the lane or the rear of the waiting queue for one signal cycle, do not escape from the stop line during a closest green time, and the surplus congestion index is an additional time required for vehicles, which have arrived at a stop line of the lane or a rear of a waiting queue during the analysis period as an initial waiting queue of the vehicles passes through the lane, when the initial waiting queue remains on the lane before the analysis period is started.

13. The method of claim 1, wherein the method for calculating and comparing evaluation indices further comprises:

an evaluation index calculation step of calculating an evaluation index as a total of composite congestion indices calculated from all lanes of the corresponding intersection;

a comparison interface display step of transmitting, to a user terminal, a comparison interface including one existing image layer for outputting a graphical output value from the actual digital twin and one or more comparison image layers for outputting graphical output values from one or more virtual digital twins; and an evaluation index display step of displaying, on a detailed information layer, an evaluation index corresponding to a traffic situation implemented as each digital twin in the comparison interface, wherein the detailed information layer is included in each of the existing image layer and the one or more comparison image layers, and the user selects one of digital twins based on the evaluation index corresponding to the traffic situation implemented as each digital twin so that a signal system of the digital twin selected by the user is reflected in the signal system of the corresponding intersection.

14. A system for calculating and comparing evaluation indices, which includes one or more memories and one or more processors and performs the method for calculating and comparing evaluation indices for a signal system of an intersection, the system comprising:

a traffic statistical information generation unit which receives image information in real time through cameras installed at points facing each road of the intersection to derive traffic object information including traffic volume for each driving direction and traffic volume for each lane on a corresponding road at a preset first cycle, and to generate traffic statistical information including the traffic object information and intersection environment information including signal system information of a corresponding intersection;

a digital twin generation step which inputs the traffic statistical information, which is generated in a unit of the preset first cycle, to a simulator, and implements a traffic situation of the intersection as a graphical digital twin based on an output value of the simulator; and a composite congestion index derivation unit which derives a composite congestion index from each of an actual digital twin, to which actual signal system information is applied, and a virtual digital twin, to which virtual signal system information input by one or more users is applied, according to each of the actual digital twin and the virtual digital twin, in which the evaluation indices are derived based on a congestion time of a predetermined number of vehicles at the corresponding intersection for a predetermined period of time.

* * * * *